United States Patent [19]
Hirai et al.

[11] Patent Number: 6,164,740
[45] Date of Patent: Dec. 26, 2000

[54] IMAGE FORMING APPARATUS WITH CHANGEABLE RECORDING MEANS AND METHOD OF FORMING IMAGE

[75] Inventors: Nobuyuki Hirai, Tokyo; Hiromichi Uno, Yokohama; Yusuke Kadokura, Abiko; Atsushi Ohtani, Inagi; Nobuyuki Bannai, Yokohama, all of Japan

[73] Assignee: Canon Kabushiki Kaisha, Tokyo, Japan

[21] Appl. No.: 08/953,669

[22] Filed: Oct. 17, 1997

[30] Foreign Application Priority Data

Oct. 17, 1996 [JP] Japan ............................ 8-274596
Oct. 17, 1996 [JP] Japan ............................ 8-274599

[51] Int. Cl.[7] ............................ H04N 1/034; B41J 29/38
[52] U.S. Cl. ............................................ 347/3; 347/6
[58] Field of Search .............................................. 347/3, 6

[56] References Cited

U.S. PATENT DOCUMENTS

| | | | |
|---|---|---|---|
| 4,313,124 | 1/1982 | Hara | 346/140 |
| 4,345,262 | 8/1982 | Shirato et al. | 346/140 |
| 4,459,600 | 7/1984 | Sato et al. | 346/140 |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 5,220,417 | 6/1993 | Sugiura | 347/3 X |
| 5,357,347 | 10/1994 | Hirose et al. | 347/3 X |
| 5,553,201 | 9/1996 | Muramatsu | 347/3 X |
| 5,751,449 | 5/1998 | Nobuta | 347/3 X |
| 5,877,783 | 3/1999 | Iwasaki et al. | 347/3 |

FOREIGN PATENT DOCUMENTS

| | | | |
|---|---|---|---|
| 79-056847 | 5/1979 | Japan | B41M 5/26 |
| 84-123670 | 7/1984 | Japan | B41J 3/04 |
| 84-138461 | 8/1984 | Japan | B41J 3/04 |
| 85-071269 | 4/1985 | Japan | B41J 3/04 |

Primary Examiner—Fred L Braun
Attorney, Agent, or Firm—Fitzpatrick, Cella, Harper & Scinto

[57] ABSTRACT

An easy-to-use image forming apparatus and method which uses either a monochrome recording cartridge or a plurality of colors recording cartridge, which, when recording an image desired by a user, does not require the user to perform unnecessary operations regarding replacement of a cartridge, change of the kind of recorded image, or selection of a form. A determination is made as to whether or not a correct cartridge is attached based on the kind of the currently attached cartridge and the image desired by the user. When it is determined that the correct cartridge is attached, recording is initiated. When it is determined that the correct cartridge is not attached, a notification prompting replacement is provided to the user. When the user instructs color reading or monochrome reading of the original, a recording operation is carried out by changing the size of the image to an appropriate size in response to the kind of recorder, original size and form size.

41 Claims, 20 Drawing Sheets

FIG. 13

| DETECTED ORIGINAL SIZE | 203dpi / 360dpi | DETECTABLE PAPER SIZE | | | |
|---|---|---|---|---|---|
| | B4 | B4 | A4 | B5 | POSTCARD |
| | A4 | B4 | A4 | B5 | POSTCARD |
| | POSTCARD | A4 | A4 | B5 | POSTCARD |
| | | B5 | B5 | B5 | POSTCARD |

FIG. 14

| DETECTED ORIGINAL SIZE | DETECTABLE PAPER SIZE | | | |
|---|---|---|---|---|
| | B4 | A4 | B5 | POSTCARD |
| B4 | B4 | A4<br>(B4→A4) | B5<br>(B4→B5) | POSTCARD |
| A4 | B4 | A4 | B5<br>(A4→B5) | POSTCARD |
| POSTCARD | B5 | B5 | B5 | POSTCARD |

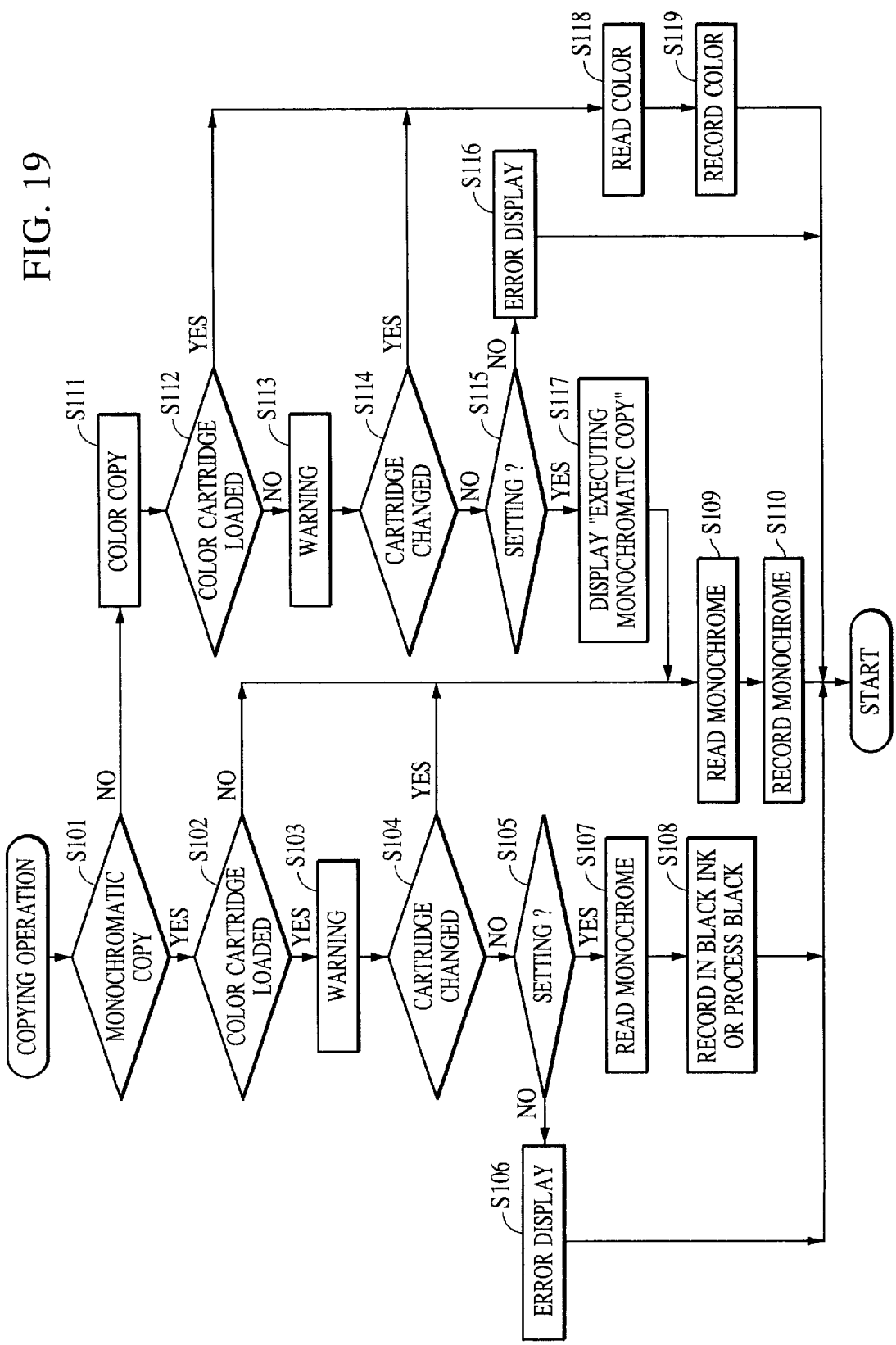

IMAGE FORMING APPARATUS WITH CHANGEABLE RECORDING MEANS AND METHOD OF FORMING IMAGE

BACKGROUND OF THE INVENTION

1. Field of the Invention

The present invention relates to an image forming apparatus permitting recording of a color image and a monochromatic image and a method of forming an image. More particularly, the present invention relates to an image forming apparatus and a method of forming an image having a configuration permitting switching between a recording material for a color image and a recording material for a monochromatic image.

2. Description of the Related Art

There is conventionally known a copying machine or a facsimile machine permitting duplication of an original by adopting a scanner capable of reading out the original image in the read section. Among these apparatuses, ones adopting the ink jet system for the printer section has are known. The ink jet system is known as a system excellent in practicability for features including tranquility upon forming an image, a low running cost because of the possibility of printing on an ordinary sheet of paper, and suitability for recording a color image.

Among the image forming apparatuses of the foregoing type, there is available one capable of copying a color original by adopting a scanner which can read out both color and monochromatic originals in addition to recording of a color image. For the image forming apparatuses having such a configuration permitting recording of a color image, there is a demand for downsizing, cost reduction, quality improvement and achievement of operating convenience.

Among the image forming apparatuses adopting the foregoing ink jet system, a type is known in which a monochromatic cartridge and a color cartridge for a color image are from time to time interchangeable by a user, depending upon the use.

In an image forming apparatus adopting the ink jet recording system and permitting copying of a color original, when, for example, copying a monochromatic original, it is a conventional practice to record a monochromatic image by means of ink contained in the cartridge capable of recording a color image (for example, any of the colors in the ink cartridge, or process black expressing black by uniformly mixing all the colors). Also when recording a received facsimile image which is usually a monochrome, it is a common practice to record the facsimile-received monochromatic image by the use of ink in the ink cartridge if the apparatus mounts a cartridge for a color image.

When the ink cartridge capable of recording a color image is always used for recording, the ink may sometimes be exhausted, making it impossible to record a color image if the user tries to record a color image while mainly using the apparatus for recording monochromatic images. A method of avoiding this inconvenience is to largely increase the ink capacity of the ink cartridge. This technique results, however, in a larger scale of the apparatus and in a higher cost.

In a configuration in which a monochromatic cartridge and a color image cartridge are interchangeable, mismatching of the type of the attached cartridge with a desired image to be recorded makes it impossible to appropriately record the image after the apparatus once operates, leading to a wasteful consumption of paper and ink. A configuration requiring the user to identify the ink cartridge to be attached and to determine whether or not the ink cartridge is to be changed in response to the kind of image is defective in that operations to be conducted by the operator are complicated and may cause a malfunction.

When the paper size is different from the original size, a conventional apparatus discontinues reading out the image. When using the apparatus at home, for example, where it is difficult to always keep a stock of papers of various sizes, therefore, it is necessary to take the trouble of obtaining papers of an appropriate size for copying the original.

Another conceivable method is to record the image by reducing the size of the image in response to the paper size. However, particularly when copying a color original, a size reduction to match the paper size leads to a serious deterioration of the image quality. Therefore this technique is not a desirable solution. In order to form a high-quality color image, it is necessary to provide an expensive and complicated magnification changing circuit.

Further, when the paper size is smaller than the original size, and the original image is recorded at full size, the recording means, particularly if the ink jet method is adopted, ejects ink onto areas outside the paper. The interior of the apparatus is thus stained, and the ink even adheres to the next page of paper, thus staining the papers.

Asking the user at each time of use, whether recording is to be made at full size or at a reduced size when the paper size is different from the original size, or whether or not recording is to be made at full size and an area matching with the paper size is to be recorded when the paper size is smaller than the original size, requires complicated operations. When considering the personal or use at home use, in which it is difficult for the user to master the operations of the apparatus, it is not desirable to require complicated operations.

SUMMARY OF THE INVENTION

The present invention was developed in view of the foregoing conventional cases, and has an object to provide a compact, low-cost and easy-to-use image forming apparatus which permits recording of a color image at any time the user wishes to record the color image without increasing the ink capacity in the ink cartridge.

Another object of the invention is to provide an apparatus which is easy for a user to use by notifying the user which of monochrome and color cartridge is currently used and whether or not the cartridge is to be changed for performing the processing desired by the user.

Another further object of the invention is to provide an easy-to-use apparatus, in which determination of the kind of cartridge and the read operation of color are conducted in linkage.

Another further object of the invention is to achieve improvement of user operating convenience by permitting recording of a monochromatic image even by the use of a color cartridge, avoiding allout impossibility of recording a monochromatic image even when a monochromatic cartridge is not available for exhaustion of ink.

The invention also has an object to provide an easy-to-use apparatus by preventing an unnecessary malfunction of the apparatus.

The invention has another further object to provide an image forming apparatus which is free from a malfunction without again making a setting in consciousness of the relationship between the kind of cartridge and the copy mode prior to starting a copy operation by the user.

Another configuration of an image forming apparatus of the invention covers an apparatus selectively and changeably mounting first recording means capable of recording a plurality of colors and second recording means recording in monochrome, and forming an image on a recording medium, including reading means capable of reading an image on an original in a plurality of colors or in monochrome; holding means for changeably holding the first recording means and the second recording means; determining means for determining a kind of recording means held in the holding means; instructing means which instructs a color copy operation or reading the image on the original in a plurality of colors by the reading means and recording the same or a copy operation of reading the image on the original in monochrome and reading the same; and control means which, when the instructing means instructs a monochromatic copy operation, and the determining means determines whether or not the second recording means is held by the recording head holding means, forms the read monochromatic image by the second recording means.

Further another configuration of the invention covers an image forming apparatus selectively and changeably mounting first recording means capable of recording a plurality of colors and second recording means recording in monochrome, and forming an image on a recording medium, comprising reading means capable of reading an image on an original in a plurality of colors or in monochrome; holding means for changeably holding the first recording means and the second recording means; determining means for determining a kind of recording means held in the holding means; instructing means which instructs a color copy operation of reading the image on the original in a plurality of colors by said reading means and recording the same or a copy operation of reading the image on the original in monochrome and recording the same; and a control means for controlling the copy operation in response to the result of determination by the instructing means and the determining means.

A method of forming an image in an apparatus which has reading means capable of reading out an image on an original in a plurality of colors or in monochrome, selectively and changeably mounts first recording means capable of recording in a plurality of colors and second recording means recording in monochrome, and forms an image on a recording medium, includes the steps of: an instructing step of instructing whether the process to be executed is a color copy operation for reading out an image on an original in a plurality of colors and recording the same or a monochromatic copy operation for reading out the same in monochrome and recording the same; a determining step of determining a kind of mounted recording means; and a controlling step of controlling as to whether an original is to be read out in a plurality of colors or in monochrome by the reading means in response to an instruction given in the instructing step and a result of determination in the determining step.

Further another configuration of the invention covers an image forming system which selectively and changeably mounts first recording means capable of recording a plurality of colors and second recording means recording in a monochrome, and forms an image on recording medium, comprising an image forming apparatus including reading means capable of reading out an image on an original in a plurality of colors and in a monochrome; holding means for changeably holding the first recording means and the second recording means; determining means for determining a kind of the recording means held in the holding means; copy operation control means which performs a copy operation in a color copy mode in which the image on the original is read out in a plurality of colors by the use of the reading means and recording the same or in a monochromatic copy mode in which the image on the original is read out in monochrome and recording the same; and monitoring means for monitoring a result of determination by the determining means and a status of recording; and an external information processing terminal which is connected to the image forming apparatus, and has instructing means capable of instructing a color copy operation and a monochromatic copy operation to the copy operation control means, and is capable of receiving monitoring information of the monitoring means.

The present invention was developed in view of the foregoing conventional cases, and has as an object to provide a compact, low-cost and easy-to-use image forming apparatus which permits recording of a color image at any time the user wishes to record the color image without increasing the ink capacity in the ink cartridge.

Another object of the invention is to provide an image forming apparatus which does not discontinue to read out an image even if the paper size is different from the original size, and eliminates the necessity of taking the trouble of obtaining papers of an appropriate size for copying the original, even when using the apparatus at home where it is difficult to always keep a stock of papers of various sizes.

Another further object of the invention is to provide an image forming apparatus which, even when the paper size is different from the original size, avoids such circumstances in which the ink is ejected onto areas outside the paper, and as a result, the interior of the apparatus is stained, and the ink even adheres to the next page of paper.

Another further object of the invention is to provide an apparatus which is easy to use in that determination of the kind of cartridge detection of the original size and the paper size, and the reading operation of colors are performed in linkage to eliminate the necessity of user input.

Another further object of the invention is to provide a high-quality and low-cost image forming apparatus in which the image quality is not deteriorated even if the paper size is different from the original size, particularly for a color copy.

To achieve the foregoing object, the image forming apparatus of the invention, which selectively and changeably mounts and first recording means capable of recording in a plurality of color and second recording means recording in monochrome, and forms an image on the recording medium, includes reading means capable of reading out an image on an original in a plurality of colors and in monochrome; holding means for changeably holding the first recording means and the second recording means; determining means which determines a kind of recording means held in the holding means; instructing means instructing as to whether the image on the original is to be read out in a plurality of colors or in monochrome by the use of the reading means; original size detecting means which detects a size of the original from which the image is read out; paper size detecting means which detects a size of the recording medium; and selecting means selecting any one of full-size recording, reduced-size recording and partial recording on the basis of a result of determination by the determining means, an instruction by the instructing means, a size of the original and a size of paper.

Further, the method of forming an image in an apparatus which has reading means capable of reading out an image on an original in a plurality of colors or in a monochrome, selectively and changeably mounts first recording means capable of recording in a plurality of colors and second recording means recording in monochrome, and forms an image on a recording medium, includes the steps of: an instructing step of instructing as to whether the image on the original is to be read out in a plurality of colors or in monochrome; an original size detecting step of detecting the original size; a reading step of reading out the original in a plurality of colors or in monochrome in compliance with the instruction by the use of the reading means; a determining step of determining a kind of recording means to be mounted; a paper size detecting step of detecting the size of the recording medium; a selecting step of selecting any one of full-size recording, reduced-size recording and partial recording on the basis of a result of determination by the determining means, an instruction by the instructing means, a size of the original and a size of paper; and a recording step of forming an image on a paper by the first recording means when reading out the image on the original in a plurality of colors, and by the second recording means when reading out in monochrome.

For achieving the objects of the invention, it is desirable that selection as mentioned above is accomplished without the presence of an operator.

One of the recording techniques applicable in the invention is the ink jet technique which uses ejecting means for ejecting an ink onto the recording medium to form an image. Particularly, the technique adopting an electro-thermal energy converter which applies a thermal energy to the ink as the aforesaid ejecting means is suitably applicable to the present invention.

BRIEF DESCRIPTION OF THE DRAWINGS

FIG. 13 illustrates sizes read out in response to a detected original size and a detected paper size during color copy operation in an embodiment of the invention;

FIG. 14 illustrates sizes read out in response to a detected original size and a detected paper size during monochromatic copy operation and size reducing technique in an embodiment of the invention;

FIG. 19 is a flowchart of operations in an embodiment of the invention.

DESCRIPTION OF THE PREFERRED EMBODIMENTS

Preferred embodiments of the invention are described in detail below with reference to the drawings.

The term "paper" as used in the following description of embodiments means a "printing medium" on which an image is to be recorded, and includes a plastic sheet used in an OHP (overhead projector) and a sheet-shaped textile, and other sheet-shaped recording media.

(First embodiment)

A preferred embodiment of the invention is a facsimile machine capable of transmitting, receiving and outputting over a telephone line an original read out through a reading mechanism of an original provided in the image forming apparatus. In this embodiment, the description covers a facsimile machine.

Figure 1:
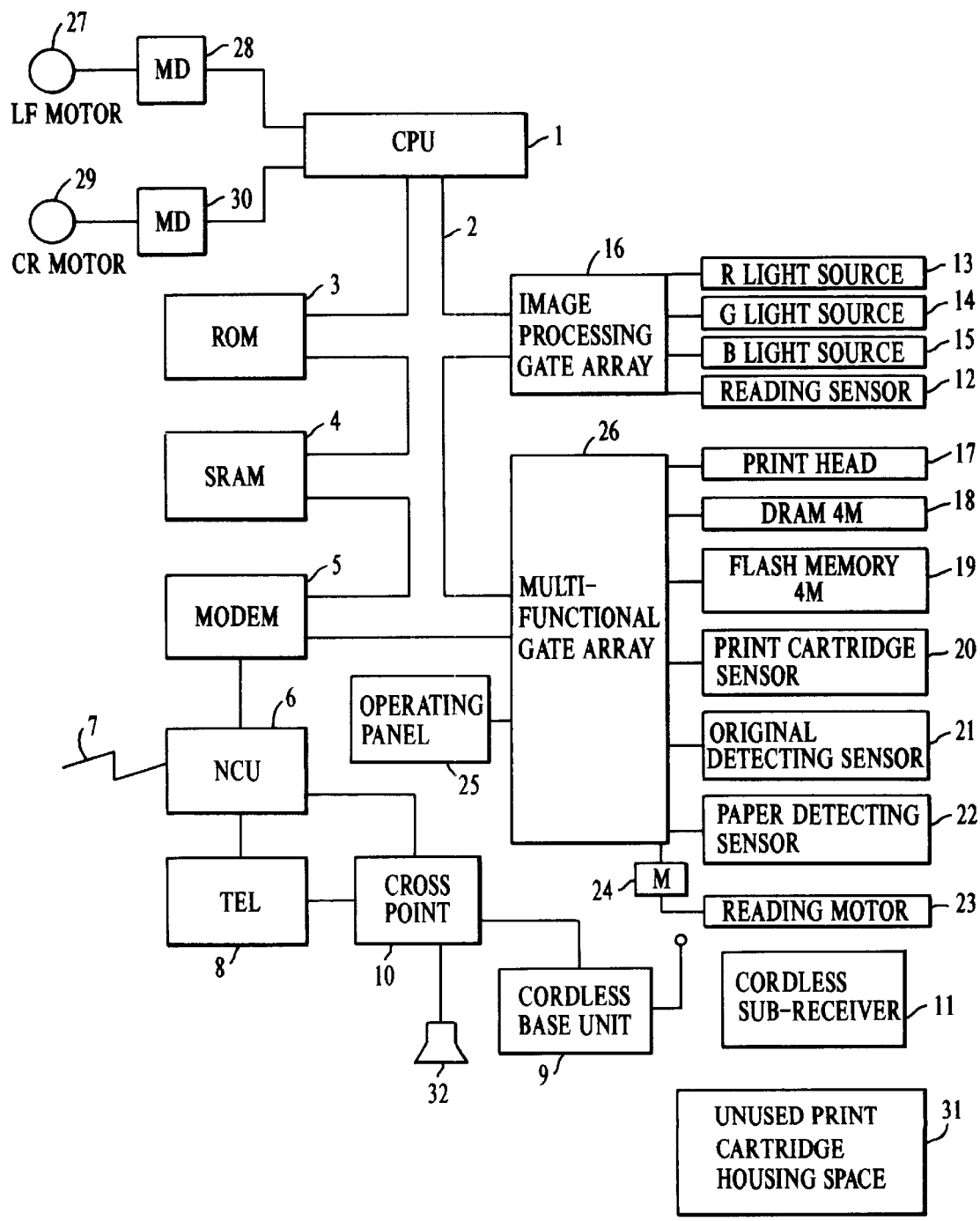
FIG. 1 is a block configuration diagram of an image forming apparatus of the present invention.

FIG. 1 is a block diagram illustrating a configuration of in a facsimile machine, a typical embodiment of the invention.

In FIG. 1, 1 is a CPU controlling the operation of the entire image forming apparatus of the invention; 2 is a bus for transfer of data or an instruction; and 3 is an ROM storing a program for controlling the CPU. As components intrinsic to a facsimile machine, there are provided a SRAM 4 which stores transmission source information and user registration information; a modem 5 for modulating or demodulating an image signal or a voice signal; and a network control unit 6 for controlling the connection between the telephone line and the present apparatus. Further, 7 is public telephone line; 8 is a wire telephone set; 9 is a base unit of a cordless telephone set; 10 is a cross point for selectively connecting the telephone line 7, the telephone set 8 and the cordless telephone base unit 9; and 11 is a sub-receiver of the cordless telephone set. Also in FIG. 1, 12 is a line sensor for reading out an image, and can read out an image at 8 pel in the main scanning direction. The line sensor 12 can read out data of the image for one line in the main scanning direction. For reading out an image by the reading sensor 12, there are provided a red LED source 13, a green LED source 14, and a blue LED source 15. LEDs are used as light sources because an LED permits equipment downsizing, gives a stable luminous energy as compared with a fluorescent lamp, and allows high-speed switching between light sources, with a rapid response property. It is thus possible to provide a high-speed image forming apparatus of the sheet-through type. As compared with a fluorescent lamp, an LED light source requires less power consumption, thus making it possible to provide an image forming apparatus suitable for home use or for personal use.

In FIG. 1, 16 is an image processing gate array which performs shading correction as described later, binarization when reading out an image in monochrome, gamma-conversion when reading out an image in color, color conversion for converting RGB into YMCK, resolution conversion for converting an image data read out by the reading sensor into a resolution permitting recording by the recording head, and turn-on control of the LED light sources. Further, 17 is a recording head recording an image. The facsimile machine of this embodiment has a configuration in which a recording head capable of recording in color and a recording head capable of recording in monochrome. The recording heads in this embodiment are based on the technique known as the ink jet technique which comprises ejecting an ink onto a recording medium such as a paper or a sheet material, thereby recording or forming an image. In the recording heads 17, a plurality of nozzles are arranged along the sub-scanning direction to form a head recording surface. An image is formed on an area corresponding to a recording width achieved by a plurality of nozzles by driving the recording head while reciprocating a carriage mounting the head in the main scanning direction upon a recording operation. Thereafter, the image is formed on a paper by transferring the paper in the sub-scanning direction and repeating the recording operation. The A recording head is not limited to an ink jet type, and may be a thermal transfer type which transfers the ink onto the recording medium by applying a thermal energy to the ink sheet.

In this embodiment, the recording head 17 represents a cartridge type integrally formed with an ink storing section incorporating a tank storing the ink. The reference numeral 18 is a DRAM temporarily storing the image for supplying the same to the print head; 19 is a flash memory for storing the received image and audio-recording contents of an answering machine; 20 is a print cartridge sensor for detecting the presence and the kind of the print cartridge; 21 is an original detecting sensor which detects the width or the presence of the original; 22 is a paper detecting sensor which detects the size or the presence of the paper used for recording; 23 is a reading motor for transferring the original (hereinafter referred to as the "original transfer motor"); 24 is a motor (M) driven for driving the reading motor; and 25 is an operation panel provided with a keyboard as an operating section and an LCD displaying the status of the image forming apparatus and the like. A color copy key instructing reading out the original and recording the same in color as described later and a monochrome key instructing reading the original in monochrome and recording the same in monochrome are arranged on the keyboard serving as the operating section.

Also in FIG. 1, 26 is a multi-functional gate array connected to the print head 17, the DRAM 18, the flash memory 19, the various sensors (20, 21 and 22), the motor driver 24 for the reading motor, and the operation panel 25. The multi-functional array 26 performs processing of converting image data arranged in the main scanning direction in match with the nozzle arrangement of the head into image data arranged in the sub-scanning direction to transfer the same to the print head, processing of converting input data keyentered from the keyboard 25 and output signals from the various sensors into code signals readable by the CPU, and timing processing of the reading motor.

The reference numeral 27 is an LF motor for transferring the paper in the sub-scanning direction; 28 is a motor driver (MD) for driving the LF motor 27; 29 is a carriage motor for driving the carriage mounting the print head; 30 is a motor driver (MD) for driving the carriage motor; and 31 is a space for housing an unused print cartridge not mounted on the carriage. While in the configuration of this embodiment, this housing space is provided within the apparatus, the space may be housed in a separate container with a view to downsizing the apparatus. In FIG. 1, 32 is a speaker for transmitting voice information such as the status of the image forming apparatus to the user.

Figure 2:
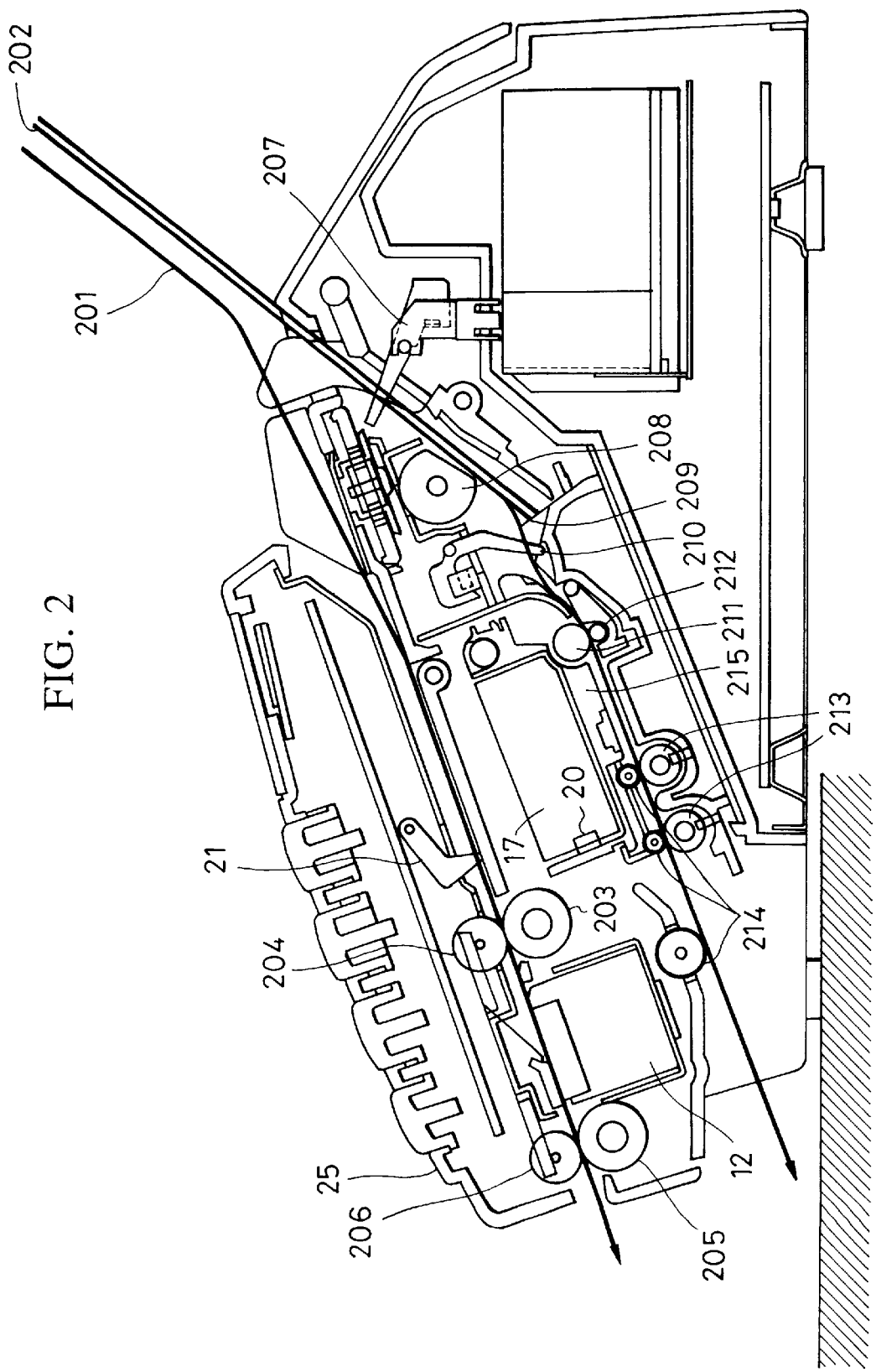
FIG. 2 is a sectional side view of the image forming apparatus of the invention.

FIG. 2 is a sectional view of the image forming apparatus of the invention. FIG. 2 represents a state in which the apparatus on a stand not shown with the right-hand direction of the drawing downward. Description is omitted here for the components having the same reference numerals as in FIG. 1.

In FIG. 2, 201 is an original; 202 is a paper; 203 is an original feed roller for feeding the original 201 toward a read position; 204 is an original feed roll rotating following the original feed roller 203; 205 is an original discharge roller for discharging the read original, connected to the reading motor 23; 206 is an original discharge roll rotating following the original discharge roller 205; 208 is a pickup roller for picking up the paper; 209 is a separating piece for feeding the paper one by one; 207 is a paper detecting sensor for detecting the presence of the paper; and 210 is a paper size detecting sensor for detecting the size of the paper. In FIG. 1, the paper detecting sensor 207 and the paper size detecting sensor 210 are integrally described as the paper detecting sensor 22. Also in FIG. 2, 211 is an LF motor for transferring the paper in the sub-scanning direction (toward the bottom in FIG. 2), connected to the LF motor 27; 212 is an LF roll rotating following the LF roller; 213 is a paper feed roller connected to the LF motor 27; and 214 is a spur made of a water-repellent material for preventing the paper from being stained by passing the spur on the ejected ink. The sensors 21, 207 and 210 serve as actuators which operate upon passage of the original or the form. The size and presence of the original or the paper is detected by detecting the movement of the actuators through an optical sensor.

Also in FIG. 2, 215 is a carriage for holding the recording head. The recording head is removably attached onto this carriage, and the sensor 20 attached to the head identifies the presence of the recording head and the kind of the attached recording head. The carriage 215 is driven by the aforesaid carriage motor 29, and recording operation is accomplished during travel of the carriage.

Figure 3:
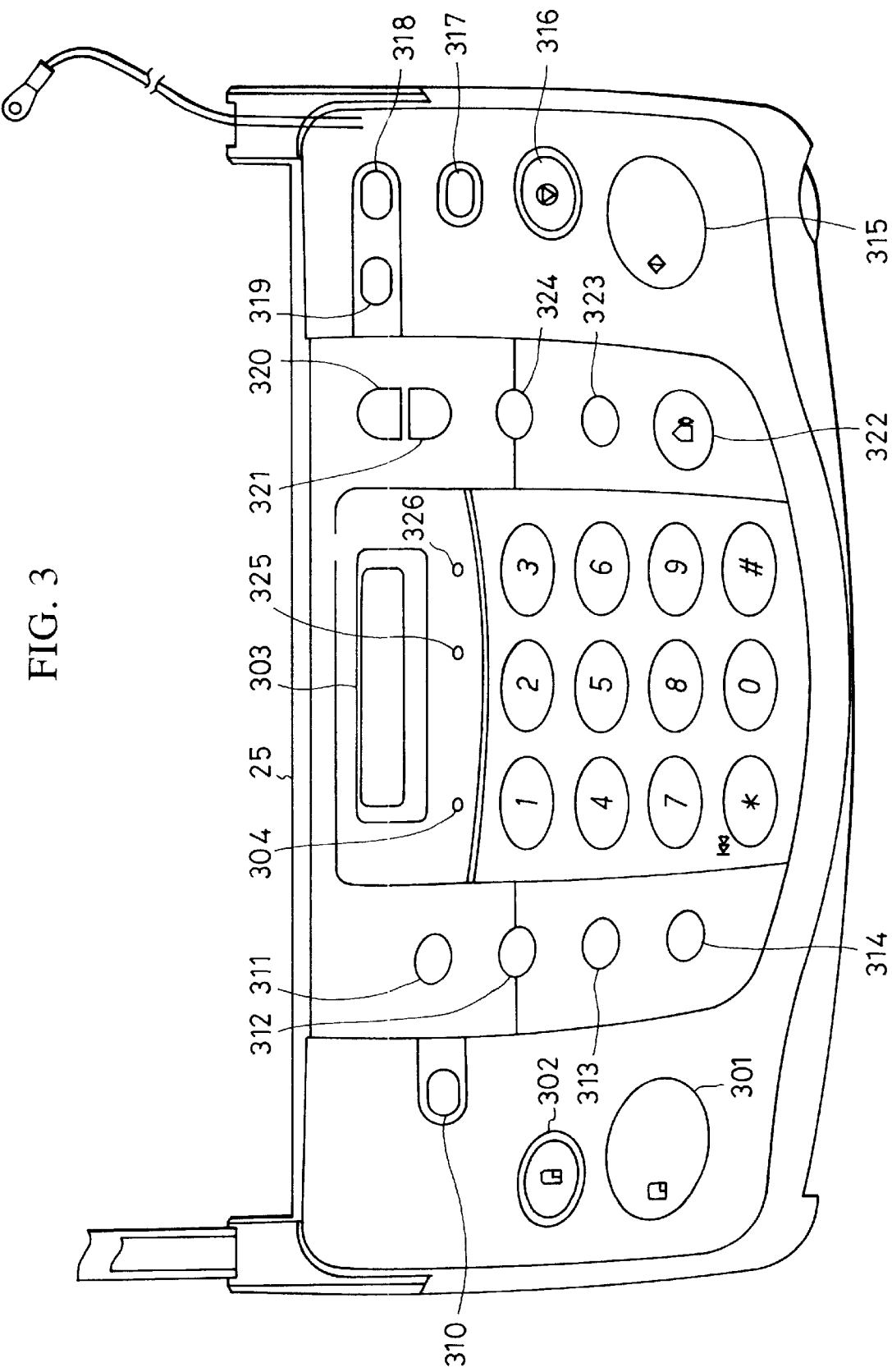
FIG. 3 is a diagram illustrating details of an operation panel 25 of the image forming apparatus of the invention.

FIG. 3 illustrates details of the operation panel 25. In FIG. 3, 301 is a color copy key for instructing to read the image in color and record the same in color; and 302 is a monochrome copy key for instructing to read the image in monochrome and record the same in monochrome. While, in this embodiment, color copy or monochromatic copy is selected by means of any of the two keys, color copy and monochrome copy may be switched over every time a single key is pressed down with a view to reducing the number of keys for downsizing the apparatus. In FIG. 3, 303 is an LCD provided as a display section for displaying the status of the apparatus and various pieces of information; and 304 is an LED lamp for notifying the user of the attachment of the color cartridge by turning it on.

FIG. 3 shows keys having various functions as components of the facsimile machine: 310 is a key for playing back the contents recorded by the answering machine function of the telephone set; 311 is a key for calling a sub-receiver as a telephone set; 312 is a redial key for calling the same dial again; 313 is a key for calling a prescribed dial registered in the apparatus; 314 is a key for bringing the telephone set into the on-hook state; 315 is a facsimile key for making a transmission by facsimile; 316 is a stop key for discontinuing facsimile or copy operation; 317 is a key for switching over the quality and concentration of a recorded image; 318 is a setting key for setting an operation or a function; 319 is a function key for calling an entry or a function for setting the same; 320 and 321 are keys for selecting a set item or a function; these keys 320 and 321 have a configuration also applicable for adjusting a received call voice amount; 322 is a key for setting the answering function; 323 is a key for playing back a recorded message; 324 is a key for erasing a recorded message; LED lamps 325 and 326 as notifying means for notifying the user of the usage status of the apparatus are provided near the display section 303; and 325 is a lamp for notifying that the telephone line is busy.

Figure 4:
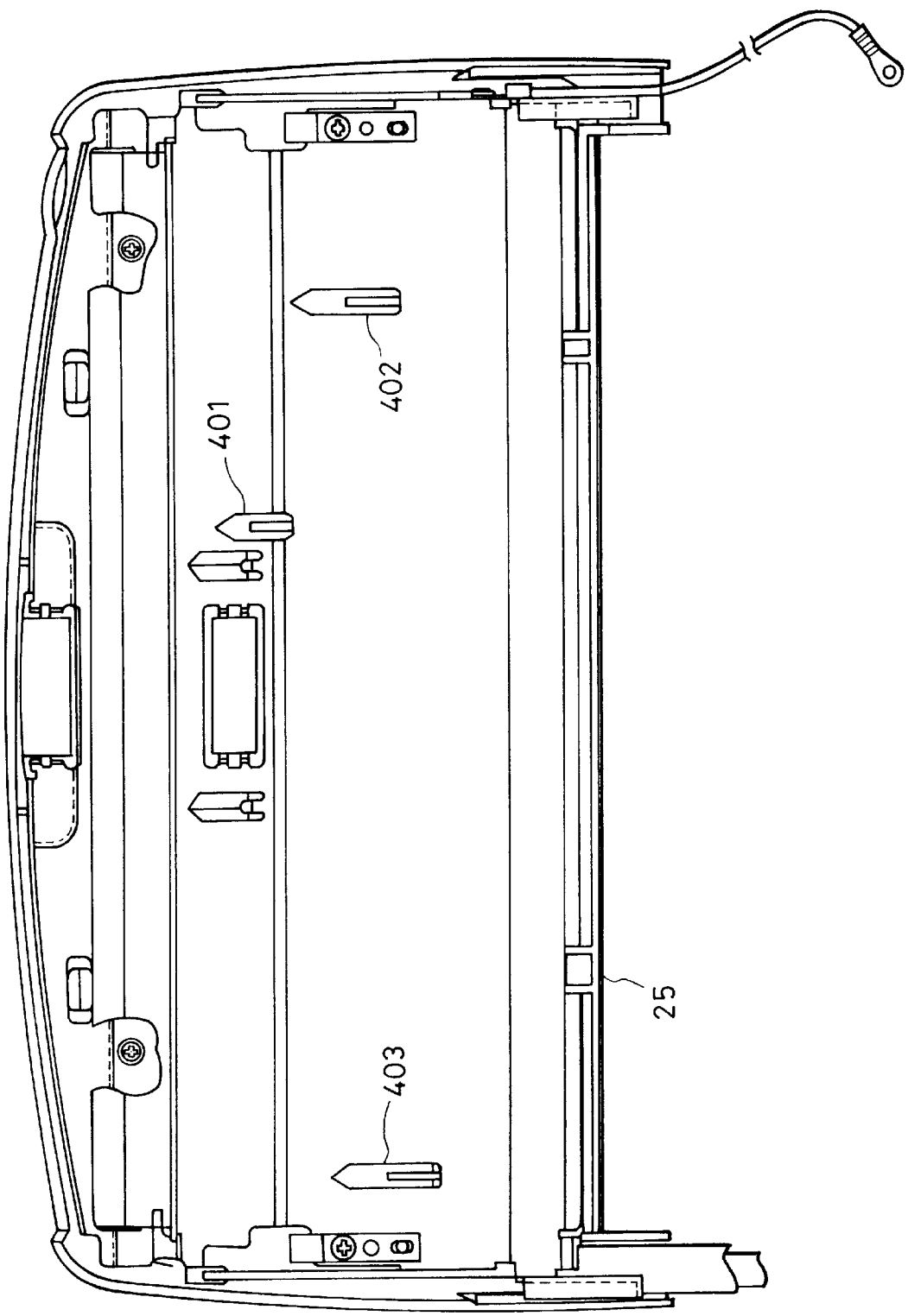
FIG. 4 illustrates the operation panel 25 of the image forming apparatus of the invention as viewed from the back.

FIG. 4 illustrates the operation panel as viewed from the back. The original detecting sensor 21 is described in detail below. The original sensor 21 is composed in practice of three sensors 401, 402 and 403. Three signal lines are derived from the three sensors and are connected to the multi-functional gate array 26. In FIG. 4, 401 is a sensor detecting the presence of the original and whether or not the original size is larger than the postcard size; 402 is a sensor detecting whether or not the original size is larger than A4; and 403 is a sensor for detecting whether or not the original is B4. The original size is detected from the status of detection of the individual sensors.

Figure 5:
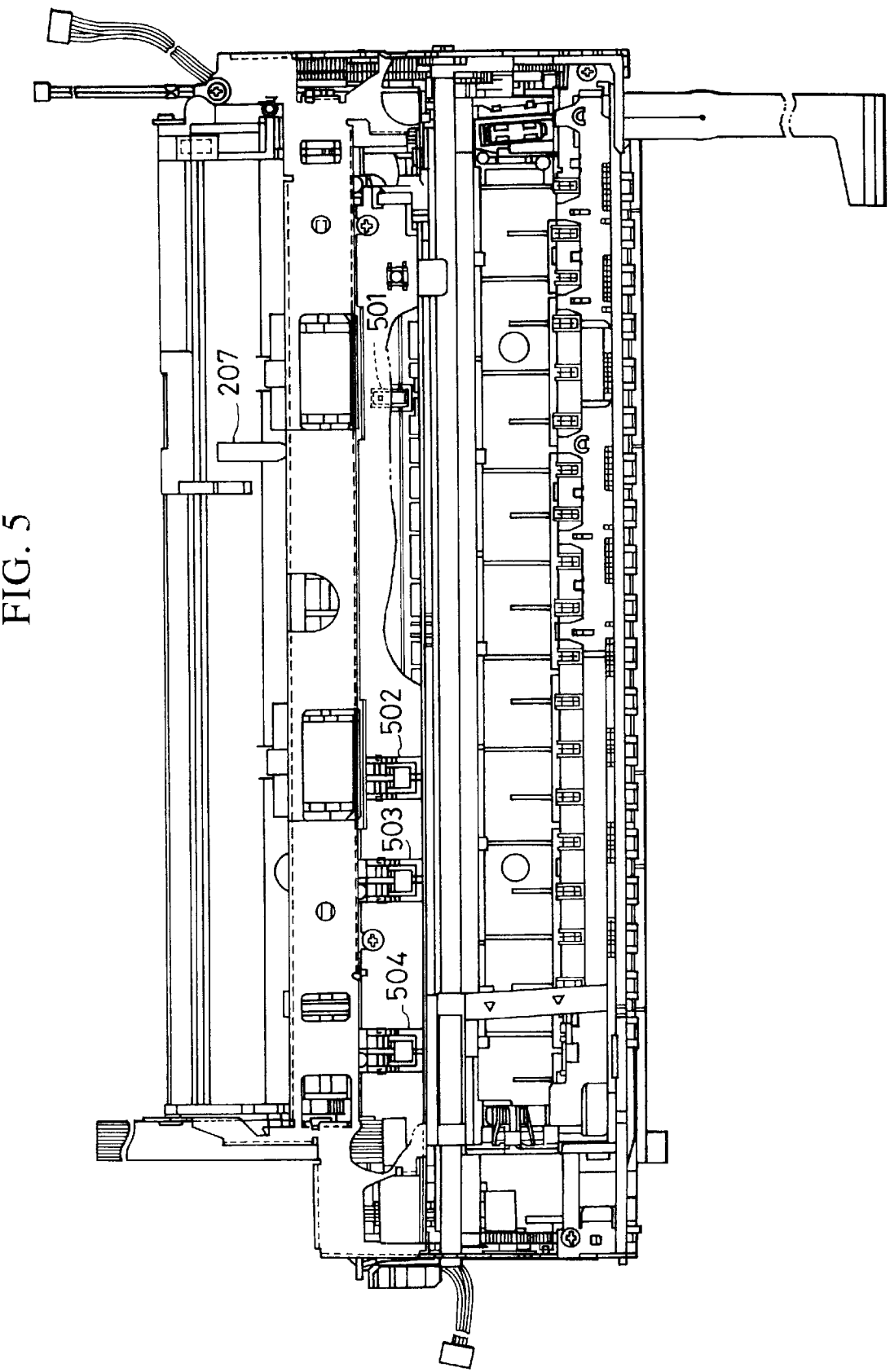
FIG. 5 illustrates details of a form detecting sensor 207 and a form size detecting sensor 210 of the image forming apparatus of the invention.

FIG. 5 illustrates details of the relative positions of the paper detecting sensor 207 and the paper size detecting sensor 210 of the paper feed section.

The paper is fed from left to right in FIG. 5. The paper size detecting sensor 210 is composed in practice of four sensors 501, 502, 503 and 504, and four signal lines are derived from the four sensors, respectively, and are connected to the multi-functional gate array 26. In FIG. 5, 501 is a postcard size detecting sensor indicating that the paper is postcard size; 502 is a B5 size detecting sensor indicating that the paper has is B5 size; 503 is an A4 size detecting sensor indicating that the paper is A4 size; and 504 is a B4 size detecting sensor indicating that the paper is B4 size. The paper size can be detected from combination of detected conditions of the individual sensors.

Now, operation of the invention is described below by means of the flowchart shown in FIG. 6. The CPU 1 executes the following operations in accordance with a program stored in the ROM 3.

First in step S601, it is determined whether or not the monochrome copy key 302 on the operation panel 25 is pressed down, and when the monochrome copy key 302 is pressed down, processing is transferred to step S617. When it is determined that the monochrome copy key 302 is not pressed down in step S601, it is then determined whether or not the color copy key 301 on the operation panel 25 is pressed down in step S602. When the color copy key 301 is not pressed down, processing is returned to step S601. When the color copy key 301 is pressed down in step S602, processing is transferred to step S603, and it is determined from an output of the sensor 401 whether or not the original is set. When the original is not set, a message prompting setting of the original "Set the original" is displayed on the LCD 303 on the operation panel 25 in step S613. The message is voice transmitted through the speaker 32, and processing is returned to S601. The user can understand from this message that a copy is not executed because of the absence of the original, and immediately takes action to find the original. Even when the user fails to confirm the LCD, or the display LCD is not legible, the user can easily find a necessary action to be taken through voice output of the message in addition to the display.

When the presence of the original is confirmed in step S603, it is determined from an output of the paper detecting sensor 207 whether the paper is present or not in the following step S604. When the paper is not set, processing is transferred to step S614, and a message prompting setting of the paper "Set the paper" is displayed on the LCD 303 on the operation panel 25. This message is voice transmitted through the speaker 32, and processing is returned to step S601. The user can understand from this message that a copy is not executed because of the absence of the paper, and immediately takes action to find the original.

When it is determined that the paper is set in step S604, it is determined from an output of the print cartridge sensor 20 whether or not the print head 17 is attached to the carriage in the following step S605. When the print head is not attached to the carriage, a message prompting setting of the print head "Set the cartridge" is displayed on the LCD 303 on the operation panel 25. The message is also voice transmitted through the speaker 32, and processing is returned to step S601. The user understands from this message that a copy is not executed because of the absence of the print head 17, and immediately takes appropriate action. Even when the user does not watch the LCD display, the user can easily find a necessary action to be taken through voice output of the message in addition to the display.

When it is determined that the print head 17 is attached to the carriage in step S605, it is determined in the following step S606 whether or not the monochrome cartridge is attached. Because this is the case of conducting color copy, when the monochrome cartridge is attached, processing is transferred to step S616, and a message prompting setting of the color print head 17 "Replace the cartridge" or "Set the color cartridge" is displayed on the LCD 303 on the operation panel 25. This message is voice transmitted through the speaker 32, and processing returns to step S601. The user understands from this message that a copy is not executed because of the absence of the color cartridge, and immediately takes appropriate action. Even when the user cannot easily read the display on the LCD, the user can easily find a necessary action to be taken through voice output of the message in addition to the display. Since color copy operation is started only after determining the kind of cartridge, it is possible to avoid an inconvenience of color copy operation (read/record of the original) being executed without attachment of the cartridge.

When it is determined in step S606 that the mounted cartridge is not the monochromatic cartridge, processing is transferred to step S607 to detect the paper size from outputs of the paper size detecting sensors 501, 502, 503 and 504, and the original width is detected from outputs of the original detecting sensors 401, 402 and 403 in the following step S608. After detection of the original width in step S608, a prescanning operation is conducted in the following step S609. The prescanning operation is further described in detail later.

Figure 7:
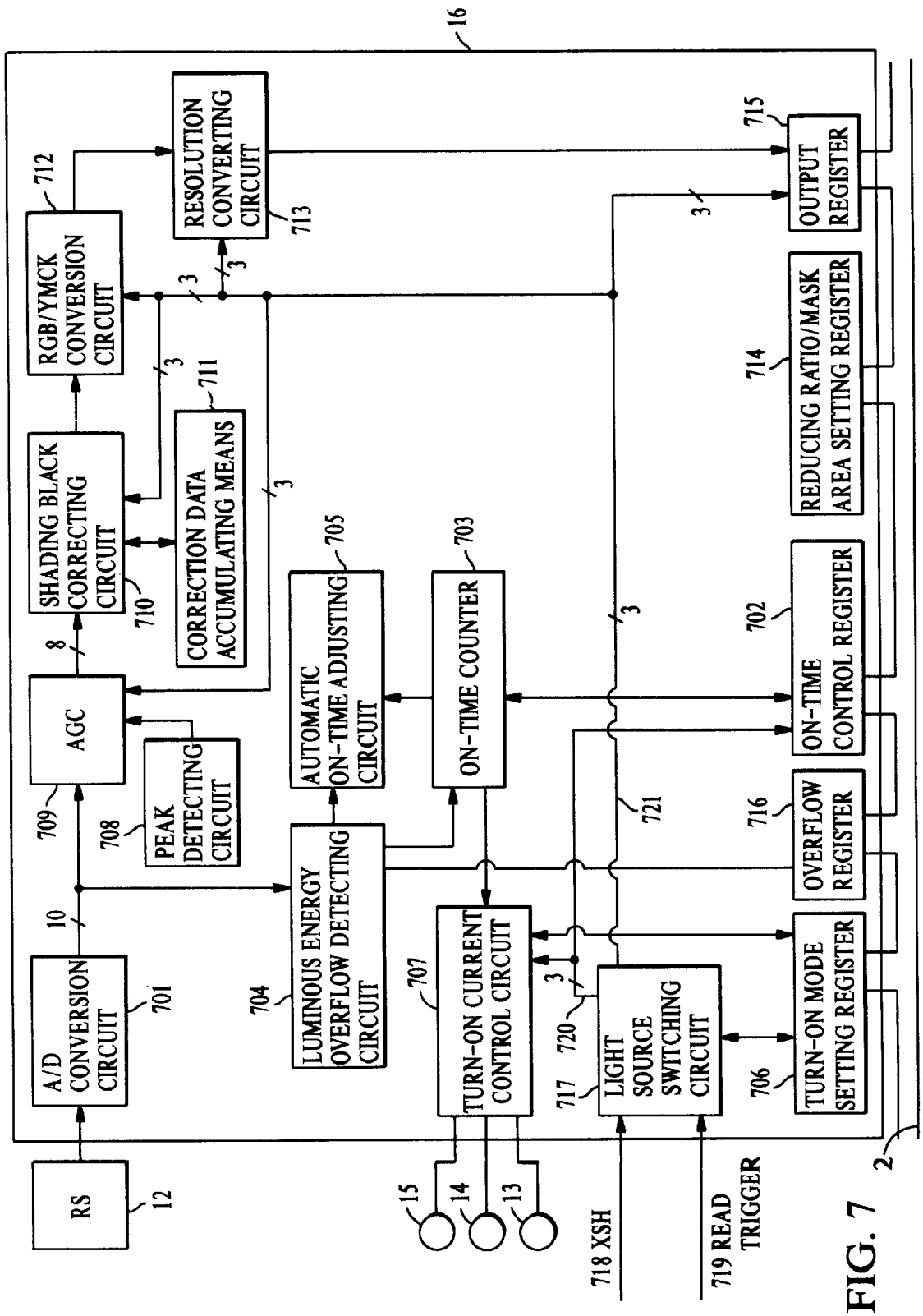
FIG. 7 illustrates an image processing gate array 16 in an embodiment of the invention.

After completion of the prescanning operation, the reading width recordable on the form is determined on the basis of the paper size and the original size detected in the preceding steps S607 and S608 and the thus determined reading width is set in the mask area/reduction ratio setting register 14 in the image processing gate array 16 and in the work area in the DRAM 18 as shown in FIG. 7 presented later. The image processing gate array 16 performs mask processing and resolution conversion other than the reading width in the main scanning direction, and the CPU 1 carries out resolution conversion in the sub-scanning direction on the basis of data in the DRAM 18. As a result, from among the image data read out by the reading sensor 12, image data for portions which cannot be recorded on the form are mask-processed. In the image forming apparatus of the invention, when the original size is larger than the paper size, an image region matched with the paper size can be read out. Even when the paper size is different from the original size, readout of the image is executed because the image forming apparatus of the invention is not designed to be adapted for home or personal use, and it is not a common practice in such uses to always keep a stock of papers of various sizes. When there is a size difference between the paper and the original, prohibiting copy operation requires the user to provide paper of a size matching the original, thus causing problems. In the configuration shown above, size reducing is not performed in conformance with the paper size, since magnification change of a color image would cause a serious deterioration of the image quality. When a conducting color copy operation, as compared with a monochrome copy operation, the processing mechanism becomes more expensive. If magnification change processing is permitted in addition, it would be impossible to provide a low-cost apparatus suitable for personal or home use.

After setting the reading width recordable on the paper, a color image read interruption processing is started in the following step S611, and a color image recording is performed in the following step S612 to complete the copy operation.

After it is determined in step S601 that the monochrome copy key 302 is pressed down, it is first determined in the following step S617 whether or not the original is set from an output of the sensor 401. When the original is not set, processing is transferred to step S626, and a message prompting setting of the original "Set the original" is displayed on the LCD 303 on the operation panel 25, and the message is voice transmitted through the speaker 32, processing being returned to step S601.

After it is determined in step S617 that the original is set, it is determined in the following step S618 from an output of the paper detecting sensor 207 whether or not the paper is present. When it is determined in step 618 that the paper is not set, a message promoting setting of the paper "Set the paper" is displayed in step S627 on the LCD 303 on the operation panel 25, and is also voice transmitted, processing being returned to step S601.

When it is determined in step S618 that the paper is set, it is determined in the following step S619 by means of the print cartridge sensor 20 whether or not the print head 17 is attached to the cartridge. When the print head 17 is not attached to the carriage, processing is transferred to step S628, and a message prompting setting of the print head 17 "Set the cartridge" is displayed on the LCD 303 on the operation panel 25, and the message is also voice transmitted through the speaker 32, processing being brought back to step S601. When the print head 17 is attached to the carriage, the paper size is detected in step S620 from outputs of the paper size detecting sensors 501, 502, 503 and 504, and then, the original width is detected from outputs of the original detecting sensors 401, 402 and 403 in step S621. Upon detection of the original width, a prescanning operation is carried out in step S622. The prescanning operation is described in further detail later.

After prescanning in step S622, a reduction ratio leading to a size matching the paper as determined in step S623 on the basis of the previously determined paper size and original size is set in the mask area/reduction ratio setting register 714 in the image processing gate array 16 and in the work area in the DRAM 18 as shown in FIG. 7 presented later. The image processing gate array 16 carries out mask processing other than the reading width in the main scanning direction and resolution conversion matching the reduction ratio, and the CPU 1 conducts resolution conversion in the sub-scanning direction on the basis of the data in the DRAM 18. Then, a monochrome image read interruption processing is started in step S624, and then, a monochrome image recording is carried out in step S625 to complete the copy operations.

Now, the foregoing prescanning is described in further detail below with reference to FIG. 7. FIG. 7 illustrates details of the image processing gate array 16. For components having the same reference numerals as in FIG. 1, description in detail is omitted.

In FIG. 7, 701 is an A/D converter circuit for converting an output signal of the reading sensor (RS) 12 into a 10-bit digital signal; 702 is a register for setting an on-time of the LED light source from the CPU 1, connected to a bus 2; 703 is a counter for controlling the on-time of the LED light source; 704 is a light amount overflow detecting circuit for detecting whether or not an output of the A/D converter circuit is overflowing under the effect of an excessive luminous energy; 705 is an automatic on-time adjusting circuit for automatically adjusting so as to prevent overflow of the on-time of the LED light source; 706 is a turn-on mode setting register which carries out setting of current for controlling the luminous energy of the LED light source, setting of the turn-on mode for controlling the light source switching circuit 717, and setting which of the light sources is to be turned on in each mode; 707 is a turn-on current controlling circuit for controlling the turn-on current supplying current to the LED light sources; 708 is a peak detecting circuit detecting a peak value of an A/D-converted image signal; 709 is an AGC circuit for selecting an optimum eight-bit luminance region from among values of luminance expressed by a ten-bit digital signal, an output of the A/D converter circuit 701 on the basis of an output of the peak detecting circuit 708; 710 is a shading/black correcting circuit for conducting shading correction and black correction; 711 is correction data accumulating means, which is a RAM for accumulating correction data obtained by 710 and performing shading correction and black correction on the basis of the accumulated correction data; 712 is an RGB/YMCK converting circuit for converting an image signal corrected by 710 into Y (yellow), M (magenta), C (cyan) and K (black); 713 is a resolution converting circuit for converting an image of a resolution of 8 pels in the main scanning direction read out by the resolution converting circuit and then by the sensor 12 into one of a resolution of 360 DPI of the printer, reducing the size of a read out image, and masking an unnecessary image; 714 is a register for setting a mask area or a reduction ratio of an image from the CPU 1 via the bus 2; 716 is a register for enabling detection of luminous energy overflow also from the CPU 1; 717 is a light source switching circuit for switching over the on-time of the light source in a time sharing manner; and 718 is a clock for switching over turn-on of the light source of the light source switching circuit 717.

In the present apparatus, when reading out a color image, a clock is entered every 5 msec, and upon every input of a clock, turn-on of the LED light sources is switched over to the red light source, the green light source and the blue light source. For monochromatic reading, a clock is entered every 10 msec, and in this case, only the green light source is turned on for a necessary period of time. Switching between color reading/monochrome reading is set by the turn-on mode setting register. The reference numeral 719 is a read trigger entered from the CPU 1. A read trigger is issued in units of a line, and the image processing gate array 16 is activated by this trigger. The reference numeral 720 comprises three signal lines indicating which of the red, green and blue light sources is to be turned on. These signal lines are connected to the turn-on current control circuit 707 and the on-time setting register 702, and conduct loading of the turn-on times for the individual red, green and blue light sources, respectively, on the on-time counter 703 and selection of a light source to which turn-on current is to be supplied. The reference numeral 721 comprises three signal lines permitting various operations on the basis of the colors of the turned-on light sources, and are connected to the AGC, the shading/black correcting circuit 710, the RGB/YMCK converting circuit 712, the resolution converting circuit 713, and the output register 715. The signal line 721 issues a timing delayed by a prescribed period of time from the timing of the signal lines 720 is issued so as to permit various kinds of processing of the turned-on light source colors on the basis of the signal lines 720.

Now, the prescanning operation by the image processing gate array 16 shown in FIG. 7 is described below with reference to the flowchart shown in FIG. 8.

Figure 6A:
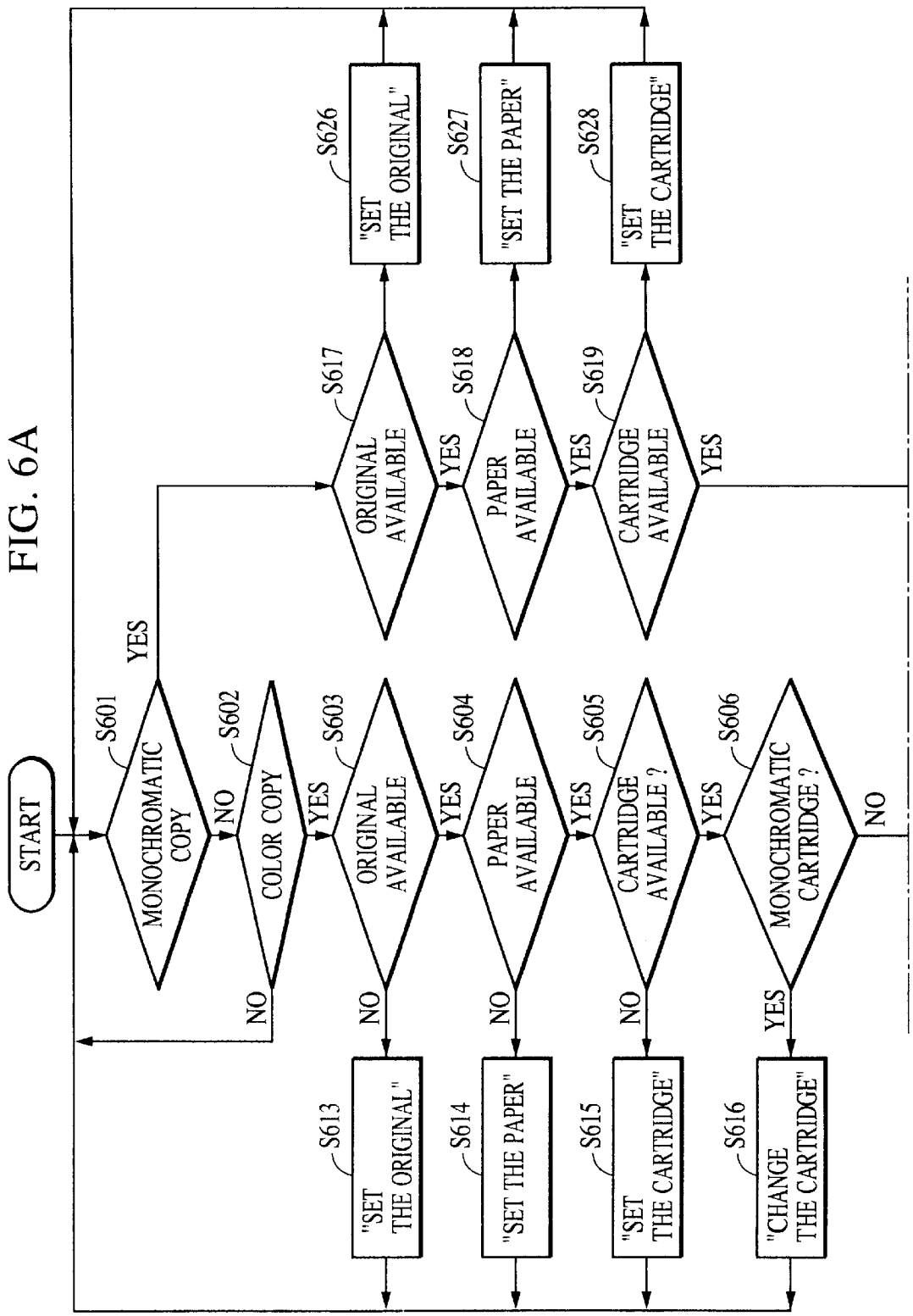
FIG. 6 which is comprised of FIGS. 6A and 6B is a flowchart illustrating operations in an embodiment of the invention.
Figure 6B:
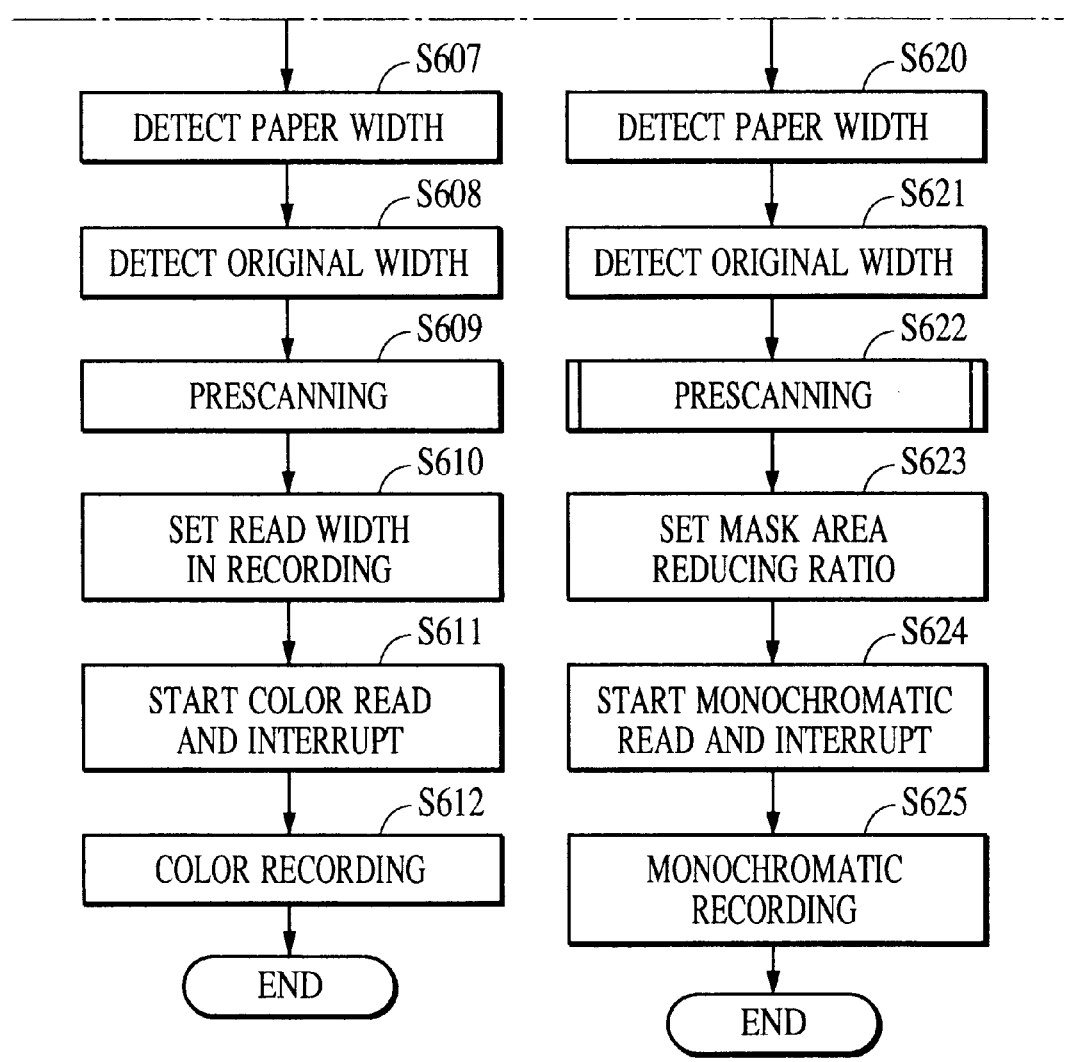
Figure 8:
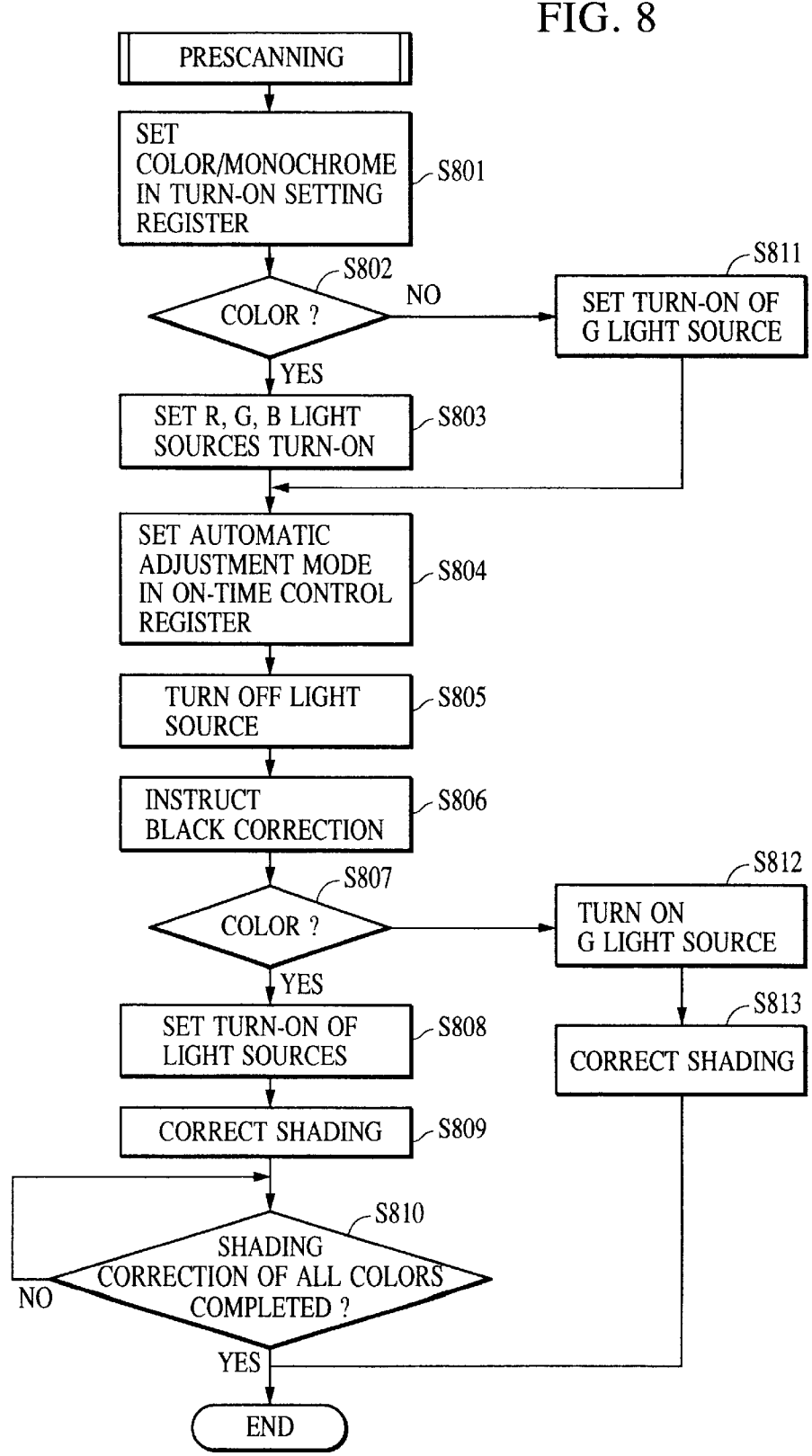
FIG. 8 is a flowchart illustrating prescanning operations in an embodiment of the invention.

In the image forming apparatus of the invention, when a prescanning operation is instructed in steps S609 and S621 in the flowchart shown in FIG. 6, a prescanning is carried out in accordance with the flowchart shown in FIG. 8. This processing is executed as follows in compliance with the program of the ROM 3 by the CPU 1.

First in step S801, for a color copy operation, the color mode is set in the turn-on mode setting register 706. When reading in a monochrome copy, the image is read out at 10 msec per line. A long accumulation time is therefore set as described above, and the value of current supplied to the LED light sources can be lower than that in color. In this embodiment, current of a value half that for a color copy is supplied to the LED light sources in a monochrome copy operation. The current value is reduced to a value lower than in color with a view to inhibit deterioration of the light sources caused by the supply of a large current to the LED light sources as far as possible. A maximum turn-on time of 5 msec is used because, even when reading out a monochrome image at a rate of 10 msec per line, a sufficient luminous energy can be ensured for reading with the maximum turn-on time of 5 msec. In the case of a color copy, a turn-on current for color is set in the turn-on current control circuit 707 by the setting of this register, and time sharing switching of the light sources of the three colors is set in the light source switching circuit 717. Then in step S802, it is determined which of a color copy or a monochrome copy is to be conducted, and in the case of a color copy operation, turn-on of the R, G and B light sources is set in step S803 in the turn-on mode setting register. In the case of a monochrome copy operation, on the other hand, processing is transferred to step S811 to make a setting so as to turn on only the green light source (G light source). After setting the light sources corresponding to a color copy or a monochrome copy, processing is transferred to step S804 to set the automatic adjustment mode in the on-time control register 702. The image forming apparatus of the invention reads out a color image in 20 msec per line, and a monochrome image in 10 msec per line. Since an image in color must be read out three times by the three LED light sources of red (R), green (G) and blue (B), the time required for reading out per LED light source of a color is shorter than the reading time in monochrome (about 5 to 7 msec). In order to maintain a luminance of an extent similar to that for monochrome, therefore, it is necessary to increase current supplied to the LED light sources to a value larger than that for monochrome. The extent of increments in current value varies with the current-luminance characteristic of the LED light sources. In this embodiment, current of a value twice as large as that supplied to the LED light source for monochrome is supplied to the LED light sources through the turn-on current control circuit 707. The turn-on mode setting register 706 is a register for controlling the current value in color reading and monochrome reading. In step S804, necessary settings are made for the individual registers. A trigger is given by the CPU 1, and the red LED light source 13 is first turned on for the maximum on-time (5 msec in this embodiment). The maximum on-time is counted by the on-time counter 705: the output of the turn-on current control circuit is ON for a period of time set in the counter, and current is supplied to the red light source 13 to turn on the red light source. The light from the red light source is irradiated onto a white board not shown and the reflected light is received by the sensor 12. The received light is photo-electrically converted in the sensor 12 into an analog electric signal which is entered into the A/D converter circuit 701. The A/D converter circuit 701 converts the entire analog electric signal into a 10-bit digital signal. The luminous energy overflow detecting circuit 704 detects whether or not this digital signal overflows. When overflow of the luminous energy is detected by the luminous energy overflow detecting circuit 704, a trigger is given to the automatic on-time adjusting circuit 705. When overflow of the luminous energy is detected, the automatic on-time adjusting circuit sets a value obtained by subtracting a prescribed time from the maximum on-time (a value obtained by subtracting 5/16 msec from 5 msec) in the on-time counter. The LED light sources are turned on again on the basis of the thus newly set value to detect an overflow of luminous energy. When an overflow occurs, the automatic on-time adjusting circuit 705 newly sets a value obtained by again subtracting a prescribed time from the on-time set in the on-time counter. The first value after luminous energy overflow is no longer detected as a result of repetition of this processing is set in the on-time register 702 as the on-time of the LED light sources. The set original is read out on the basis of this on-time. This processing is carried out while switching in a time-sharing manner every 5 msec also for the green LED light source and the blue LED light source. In the case of a monochrome copy, a setting is made so as to turn on the green light source for the maximum on-time (5 msec). In this case, only the green light source is turned on, and adjustment of the on-time for this light source is accomplished in the same manner as in the case of a color copy.

Upon completion of the on-time for the light sources in step S804, all the light sources are turned off in the following step S805. In the following step S806, the CPU 1 gives an instruction of black correction to the shading/black correcting circuit 710. In this processing, black correction is performed to correct fluctuations in output for the individual pixels of the reading sensor 12. When black correction data are requested, data of black correction are accumulated in the correction data accumulating means 711. In the following step S807, it is determined whether or not a color copy is instructed. When a color copy is instructed by the color copy key 301, the three light sources R, G and B are set as kinds of light source to be turned on in the turn-on mode setting register in step S808. Then, processing is transferred to step S809, and the image processing gate array 16 is instructed to perform a shading correction in a time sharing manner for each color on the basis of the on-time for each light source as determined in the preceding step S804. The shading/black correcting circuit 710 reads out a white board not shown and conducts a shading correction, and correction data for each color are accumulated in the correction data accumulating means 711. In the following step S810, it is determined whether or not shading correction for all the colors has been completed. The prescanning is completed upon completion of shading correction.

In the case of a monochrome copy operation in step S807, processing is transferred to step S812 to turn on the green light source. In the following step S813, the shading/black correcting circuit 710 reads out a white board not shown in compliance with the on-time of the green light source as determined in step S804 to conduct a shading correction; and accumulates green correction data in the correction data accumulating means 711 to complete the prescanning.

Figure 15:
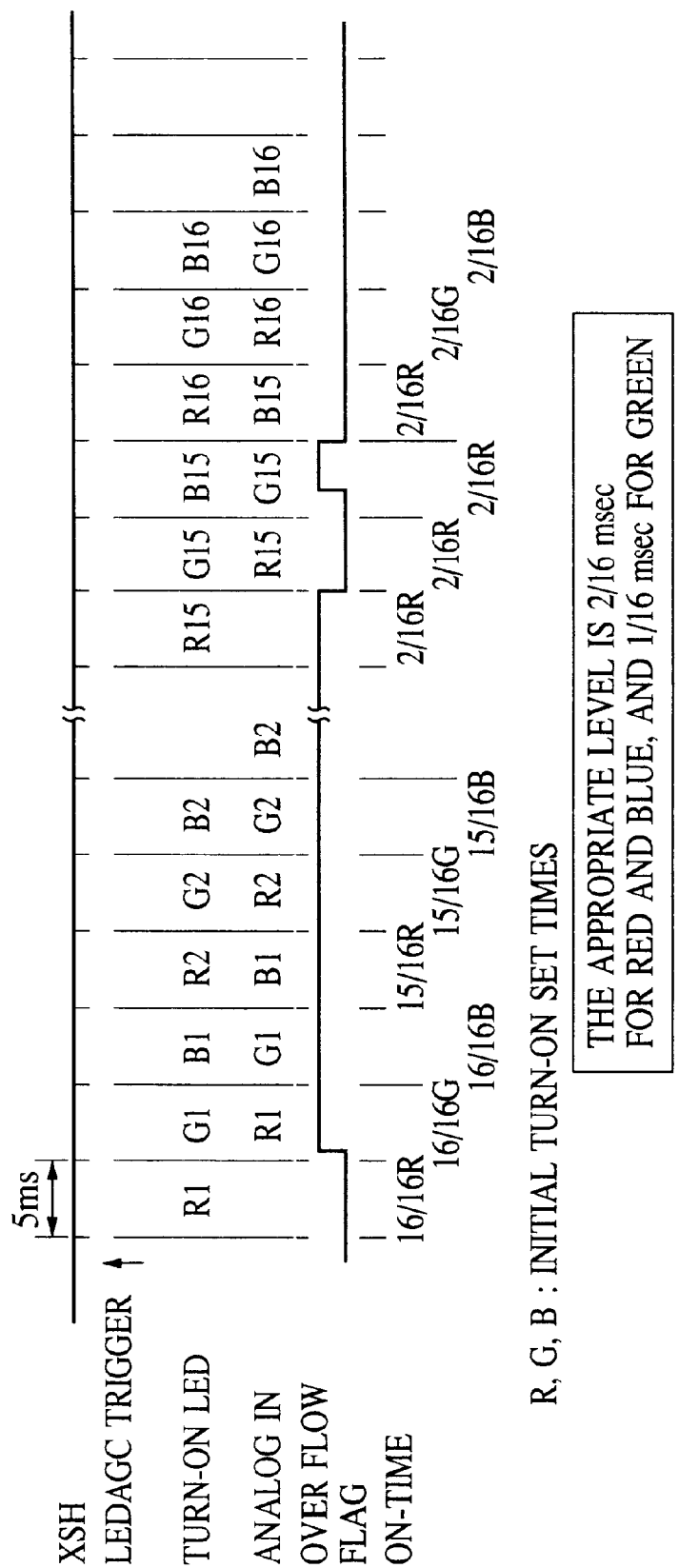
FIG. 15 is a timing chart of adjustment of light source on-time for a color copy in an embodiment of the invention.

Now, the timing of adjusting the light source on-time for a color copy will be described below with reference to the timing chart shown in FIG. 15. In a monochrome copy, only the G light source is turned on as shown in FIG. 15, and a detailed description thereof is omitted.

After setting of the various registers in steps S801 and S803 in the flowchart shown in FIG. 8, an LEDAGC trigger is given by the turn-on mode setting resister to the light source switching circuit (LEDAGC trigger) to start automatic adjustment of the on-time. In FIG. 15, XSH represents clock pulses given to the light source switching circuit 717 every 5 msec. LEDs turned on by the light switching circuit 717 are controlled so as to be turned on every 1 XSH (5 msec) in the sequence of R→G→B. As is indicated by ANALOG INPUT shown in FIG. 15, images of the individual colors read out by the turned-on light sources are entered into the A/D converter circuit 701 in a delay of 1 XSH from the turn-on timing. Upon issuance of the LEDAGC trigger, a maximum on-time (5 msec) for each color is set in the on-time counter. Values obtained by subtracting 1/16 from the maximum on-time every 3 XSH (15 msec) are set for each color as count values of the on-time counter. When an overflow is detected in any of the set on-times, an overflow flag is marked after ANALOG IN in a delay of about 1 XSH from the setting of the on-times in the on-time counter 703 and the overflow register 716. When an overflow is no longer detected for any of the colors (in FIG. 15, 2/16 msec for red and blue, and 1/16 msec for green), on-times for the individual colors are determined, and the on-times when an overflow is no longer detected are set in the on-time control register so as to distinguished between different colors.

Adjustment of on-time is carried out for each color because emitting property varies between colors and there are individual differences or time changes in emitting properties even between LED light sources of the same color. Therefore, even when an image is read out in a predetermined on-time upon shipping from the factory, insufficient luminous energy may cause deterioration of the image quality.

On the other hand, when an on-time for the LED light sources is determined, the peak detecting circuit 708 detects the peak value of luminous energy for that on-time. The AGC circuit 709 selects an optimum dynamic range of eight bits from among 10-bit digital signals on the basis of the detected peak value, and issues the same in the form of an 8-bit digital signal. The issued digital signal is entered into the shading/black correcting circuit 710 to turn off all the LED light sources, and the value read out by the reading sensor 12 is entered into the AGC circuit 709 and the shading/black correcting circuit 710 performing shading and black correction. The shading/black correcting circuit 710 corrects variations of the individual pixels of the reading sensor when reading out a black image. This value of black correction is accumulated in the correction data accumulation means 711. Then, variations in sensitivity of the individual pixels of the reading sensor 12 are corrected on the basis of the value resulting from readout of the white board not shown. The value of this shading correction is determined for each of the LED light sources R, G and B, and accumulated in the correction data accumulation means.

Figure 9:
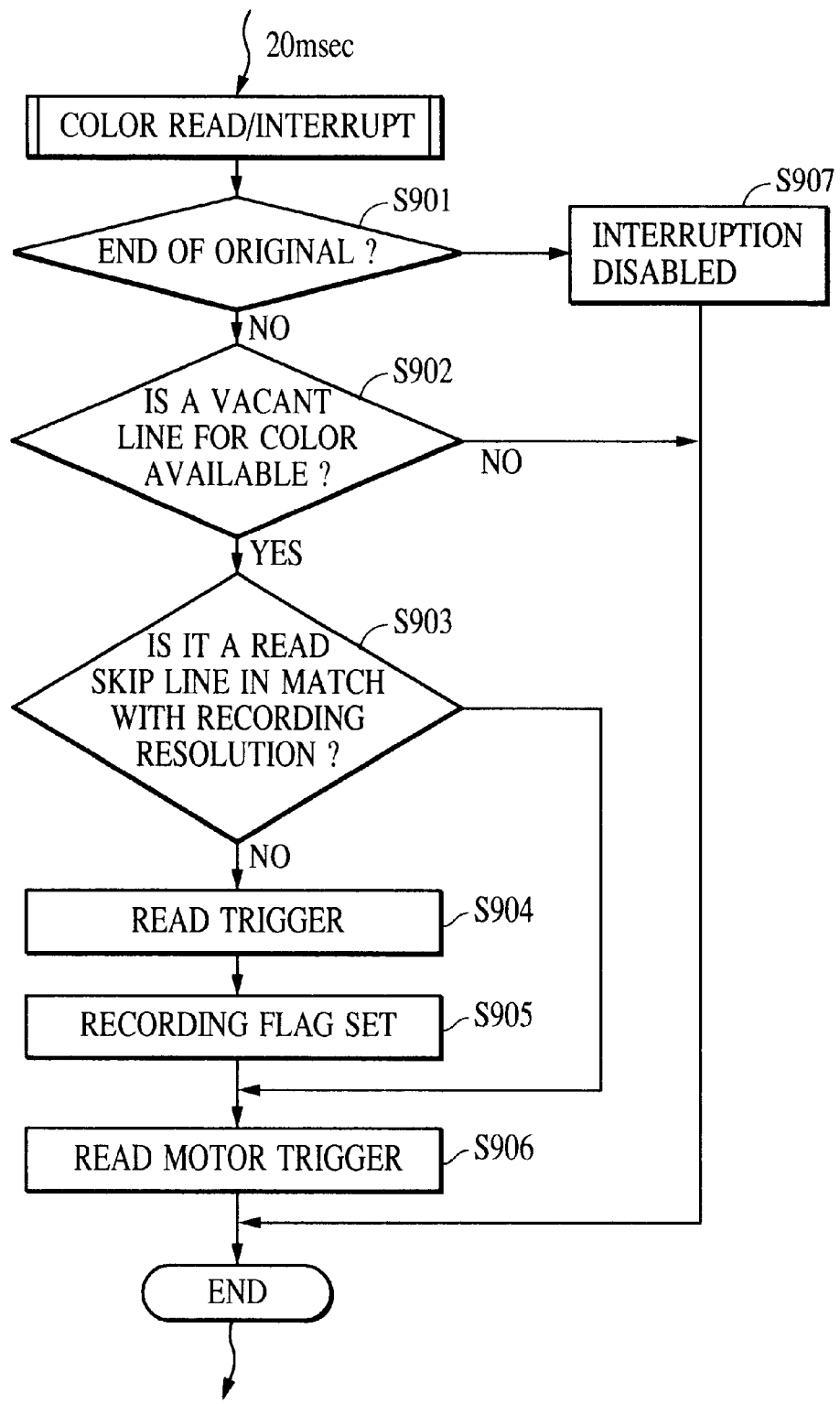
FIG. 9 is a flowchart illustrating color original reading operations in an embodiment of the invention.

Now, the color reading task is described below with reference to FIGS. 7 and 9.

When the color reading is started in step S611 in the flowchart shown in FIG. 6, an interruption processing is started every 20 msec. It is first determined whether or not transfer of the original is completed in step S901. If completed, interruption is disabled in step S907, and the interruption processing is completed. If transfer of the original has not as yet been completed in step S901, it is determined in step S902 whether or not a vacancy for one line for a color image is available in the DRAM 18 (four lines in total including each one line for each of the colors Y, M, C and K of the image after RGB/YMCK conversion). If a vacancy of a color line is not available, the interruption processing comes to an end. If it is determined that there is available a vacancy of one color line, a resolution converting processing in the sub-scanning direction is carried out. Because the recording resolution of 360 DPI is coarser than the reading resolution of 15.4 pel (about 400 DPI) in the sub-scanning direction, it is necessary to thin out by about 10% from the lines read out. In the following step S903, the CPU 1 determines, on the basis of the data set in the DRAM 18 in the processing in step S610 shown in FIG. 16, whether or not a particular line is to be skipped without reading out to meet the resolution of the record. If it is determined that the line is not to be skipped over reading, processing is transferred to step S904, and a reading trigger is issued. Upon receipt of the reading trigger, the image processing gate array 16 sequentially turns on the LED light sources R, G and B in accordance with the LED light source on-times as determined through the foregoing prescanning to read out the image. The read image is subjected to processes such as shading correction, black correction and RGB/YMCK conversion in the image processing gate array 16.

Then, the resolution converting circuit 713 converts the reading resolution of 8 pels (about 200 DPI) of the image into a resolution of 360 DPI capable of being recorded by the print heads in the main scanning direction, and masks an area not recordable on the paper, so that the image is contained within the paper size, in accordance with the value set in the mask area/reduction ratio setting register 714. FIG. 13 illustrates sizes of recorded images corresponding to combinations of the original size and the paper size during color copy operation. During color copy operation, all images are read out in full size.

Image data of C (cyan), M (magenta), Y (yellow) and K (black) resolution-converted by the resolution converting circuit 713 are sent to the output register 715, and stored in the DRAM 18. After storing the image data in the DRAM 18, the record flag is set in the work area of the DRAM 18 in step S905. After setting the record flag, a reading flag is issued in the following step S906, and the original is fed by one line by driving the reading motor to complete the color read interruption processing.

When it is determined in step S903 by the CPU 1 that the line is to be skipped, without reading out, matching the recording resolution, processing is transferred to step S906 to issue a reading trigger and to feed the original by one line by driving the reading motor, thereby completing the color read interruption processing. Through this interruption processing at 20 msec, it is possible to achieve a reading at 20 msec per line. Because this is slower than the reading rate for a monochrome image described later (the processing rate per line per color is kept about twice as high as that in a monochrome image), there is no excessive load on the system, and a high-image-quality color copy is available with a low-cost system.

Figure 16:
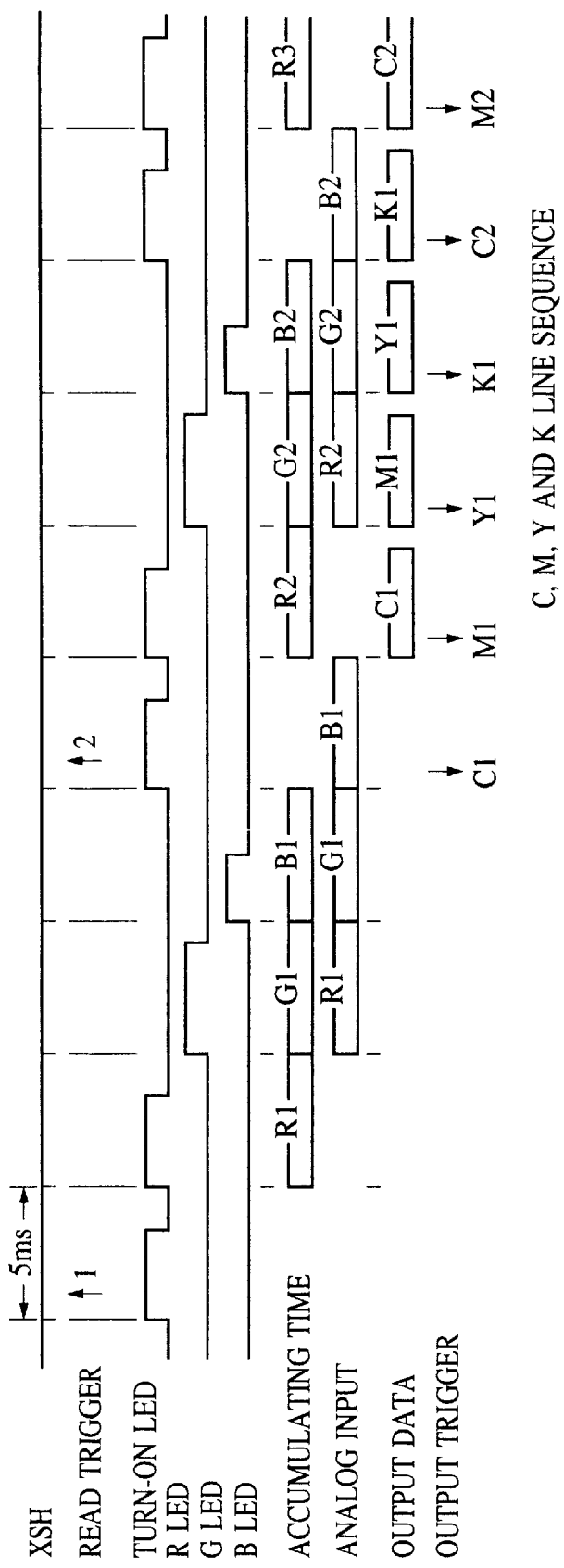
FIG. 16 is a timing chart upon reading out a color image in an embodiment of the invention.

FIG. 16 is a timing chart for reading out a color image. The timing chart for reading of a monochrome is omitted.

In FIG. 16, XSH is a clock pulse given every 5 msec to the light source switching circuit 717. When a reading trigger is given through a signal line 719 to the light source switching circuit 717 in step S904 in the flowchart shown in FIG. 9, the light source switching circuit 717 sequentially turns on every XSH (5 msec) in the order of R→G→B (turned-on LEDs). Images of the individual colors thus read out by the turned-on LEDs are entered into the A/D converting circuit 701 in delay by 1 XSH from the turning-on timing (ANALOG INPUT). When the reading trigger is issued, values determined through the prescanning processing for the individual colors are set every XSH in the on-time counter. In accordance with the set on-times, the LEDs are turned on while sequentially switching over in a time sharing manner line by line for each color. The output data are put out as YMCK data in delay by 1 XSH (5 msec) from the ANALOG INPUT.

Figure 10:
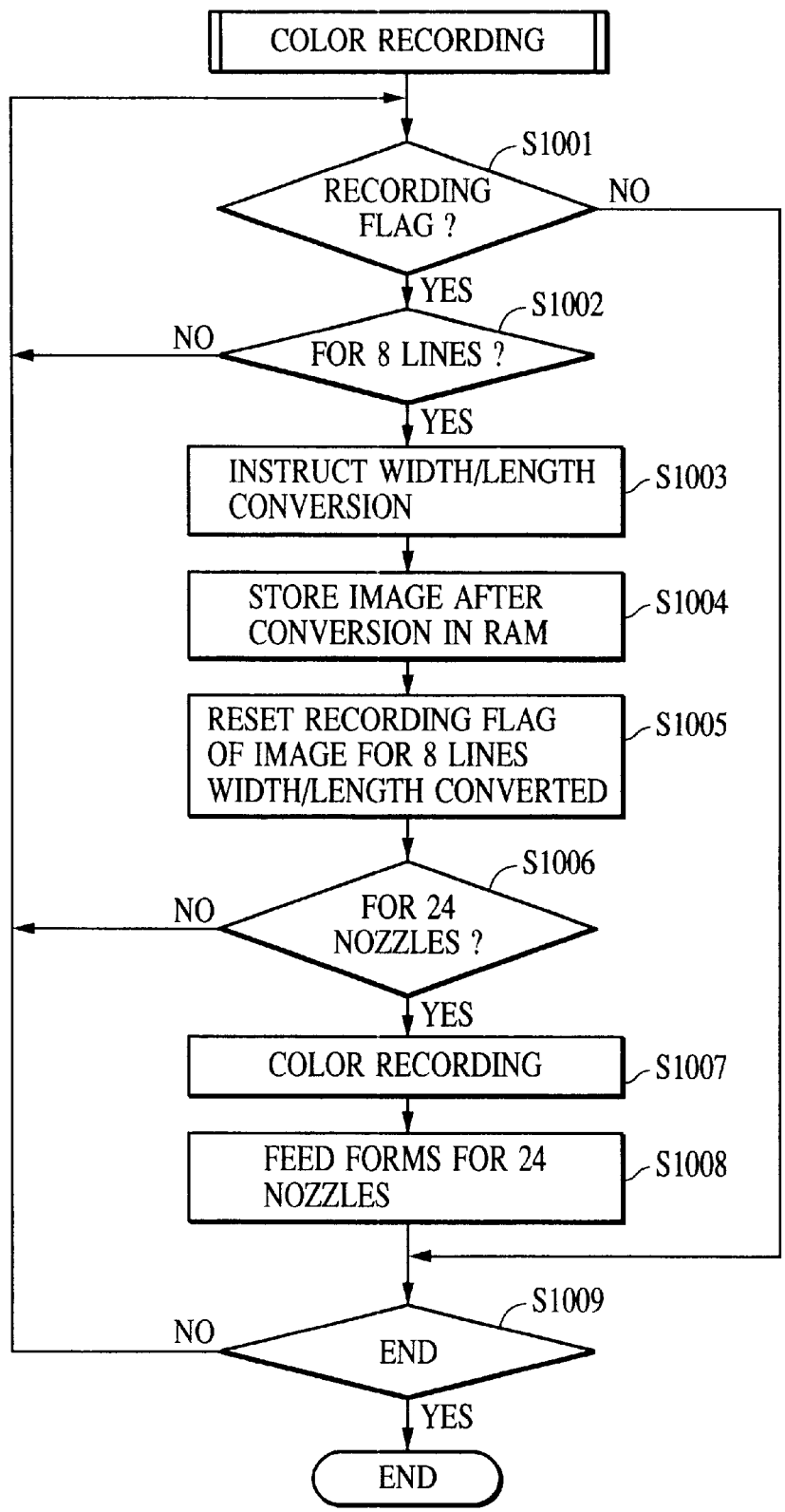
FIG. 10 is a flowchart illustrating color recording operations in an embodiment of the invention.

The color recording task is described with reference to FIG. 10. The color recording task is started by processing in step S612 of the flowchart shown in FIG. 6.

The following operations are carried out by the CPU 1 in accordance with the program in the ROM. First in step S1001, it is determined from the presence or absence of the recording flag whether or not an image to be recorded in the DRAM 18 is present. If absent, processing is transferred to step S1009. If an image to be recorded is present, it is determined in step S1002 whether an image to be recorded corresponding to eight lines is accumulated. If an image to be recorded corresponding to eight lines is not accumulated, accumulation is waited for, and if accumulated, processing is transferred to step S1003, and the multi-functional gate array 26 is instructed to perform a width/length conversion rearranging data in the sub-scanning direction with a view to supplying the image data accumulated for eight lines in the main scanning direction in the DRAM 18 to the print heads. Upon instruction of the width/length conversion, the multi-functional gate array 26 performs width/length conversion, stores the image data after width/length conversion in step S1004 into the DRAM 18, and resets in step S1005 the recording flag for eight lines. In the case of the image processing apparatus of this embodiment, the print heads for recording a color image make a line in the sub-scanning direction each with 24 nozzles and in parallel with the main scanning direction in the order of Y, M and C. Further, 64 nozzles for recording black are arranged in parallel with the Y, M and C nozzles. When recording a color image, recording is possible when image data for all of Y, M, C and K have been accumulated in an amount of 24 nozzles. In the following step S1006, therefore, it is determined whether or not all the image data of Y, M, C and K for 24 nozzles have been accumulated. When image data for 24 nozzles are not accumulated in step S1006, processing is returned to step S1001, and accumulation of data is waited for. When image data for 24 nozzles are accumulated in step S1006, the color image for 24 nozzles are recorded in the following step S1007 on the basis of the accumulated data by driving a CR motor 29. When the color image for 24 nozzles is recorded, forms for 24 nozzles are fed in the following step S1008 by the CPU 1 by driving the LF motor 27. In the following step S1009, it is determined whether or not recording of all data is completed. If recording is completed, processing is returned to step S1001, and if completed, the color recording task comes to an end.

Figure 11:
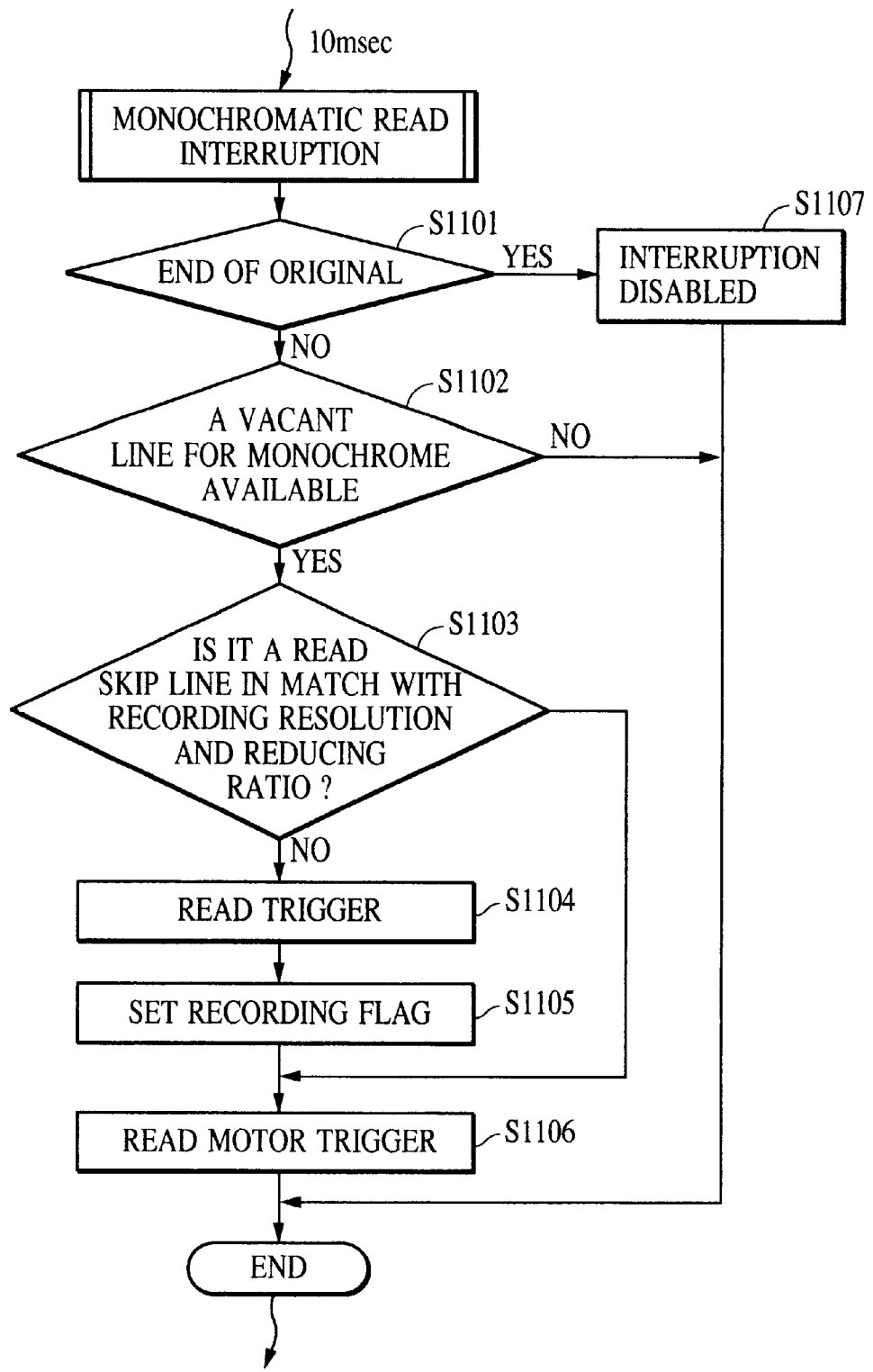
FIG. 11 is a flowchart illustrating monochromatic reading operations in an embodiment of the invention.

The monochrome read processing is described with reference to FIGS. 7 and 11.

When monochrome read processing is started by the operation in step S624 of the flowchart shown in FIG. 6, interruption processing is started every 10 msec.

When monochrome read interruption processing is started in step S611 shown in FIG. 6, the CPU 1 first determines in step S1101 whether or not transfer of the original has been completed in step S1101. If transfer of the original has been completed, the interruption processing is completed by prohibiting the interruption in step S1107. If transfer of the original has not as yet been completed in step S1101, processing is transferred to step S1102, and it is determined whether or not there is a vacancy for one line of a monochrome image in the DRAM 18. When no vacancy for one monochrome line is available in step S1102, the interruption processing comes to an end. When it is determined that a vacancy is available for one monochrome line in step S1102, the CPU 1 performs a resolution conversion in the sub-scanning direction. Because the recording resolution of 360 DPI is coarser than the reading resolution of 15.4 pel (about 400 DPI) in the sub-scanning direction, it is necessary to thin out the read line by about 10%. When the original image is reduced so as to be contained within the form size, it is necessary to thin out the read line matching the reduction ratio. The CPU 1 therefore determines whether or not the line is to be skipped without reading matching the reduction ratio, on the basis of the data previously set in step S623 (in the flowchart shown in FIG. 6) in the DRAM 18. When it is determined that the line is not to be skipped over reading in step S1103, a reading trigger is issued in the following step S1104, and the image processing gate array 16 having received the reading trigger turns on the green LED light source in accordance with the LED light source on-time as determined through the foregoing prescanning to read out the image. The image is read out with the green LED light source because the green LED light source has properties closest to those of the white LED light source. When providing a low-cost and compact image forming apparatus for home use as in the present invention, installation of a separate white LED light source results in a higher cost and a larger scale of the apparatus. The read image is then subjected to image processing such as shading correction and a black correction by the image processing gate array 16. Then in the resolution converting circuit 713, the image is subjected to a resolution conversion processing from the reading resolution of 8 pel (about 200 DPI) of the image into the resolution of 360 DPI recordable by the print heads in the main scanning direction, and an area masking and reducing processing of the area not recordable on the paper so as to be contained within the paper size in accordance with the value set in the mask area/reduction ratio setting register 714.

FIG. 14 illustrates sizes of an image recorded in various combinations of the original sizes and the paper sizes (the symbol B4→A4 in the drawing means that a B4-size original is to be reduced to A4 size for recording). The image data resolution-converted by the resolution converting circuit 713 are put out to the output register 715 and stored into the DRAM 18. In step S1105, upon storage of the image data into the DRAM 18, a recording flag is set in the work area of the DRAM 18. When the recording flag is set, a reading trigger is issued in the following step S1106, and the original is fed by a line by driving the reading motor to complete the monochrome read interruption processing. When it is determined in step S1103 that the line is to be skipped without reading out to meet the recording resolution and the reduction ratio, processing is transferred to step S1106 to issue a reading motor trigger, and feed one line of the original by driving the reading motor to complete the monochrome read interruption processing. As a result of this interruption processing, it is possible to achieve reading at 10 msec per line. As the monochromatic image processing is simpler than the color image processing, a monochrome copy is available at a reading rate higher than that in color.

Figure 12:
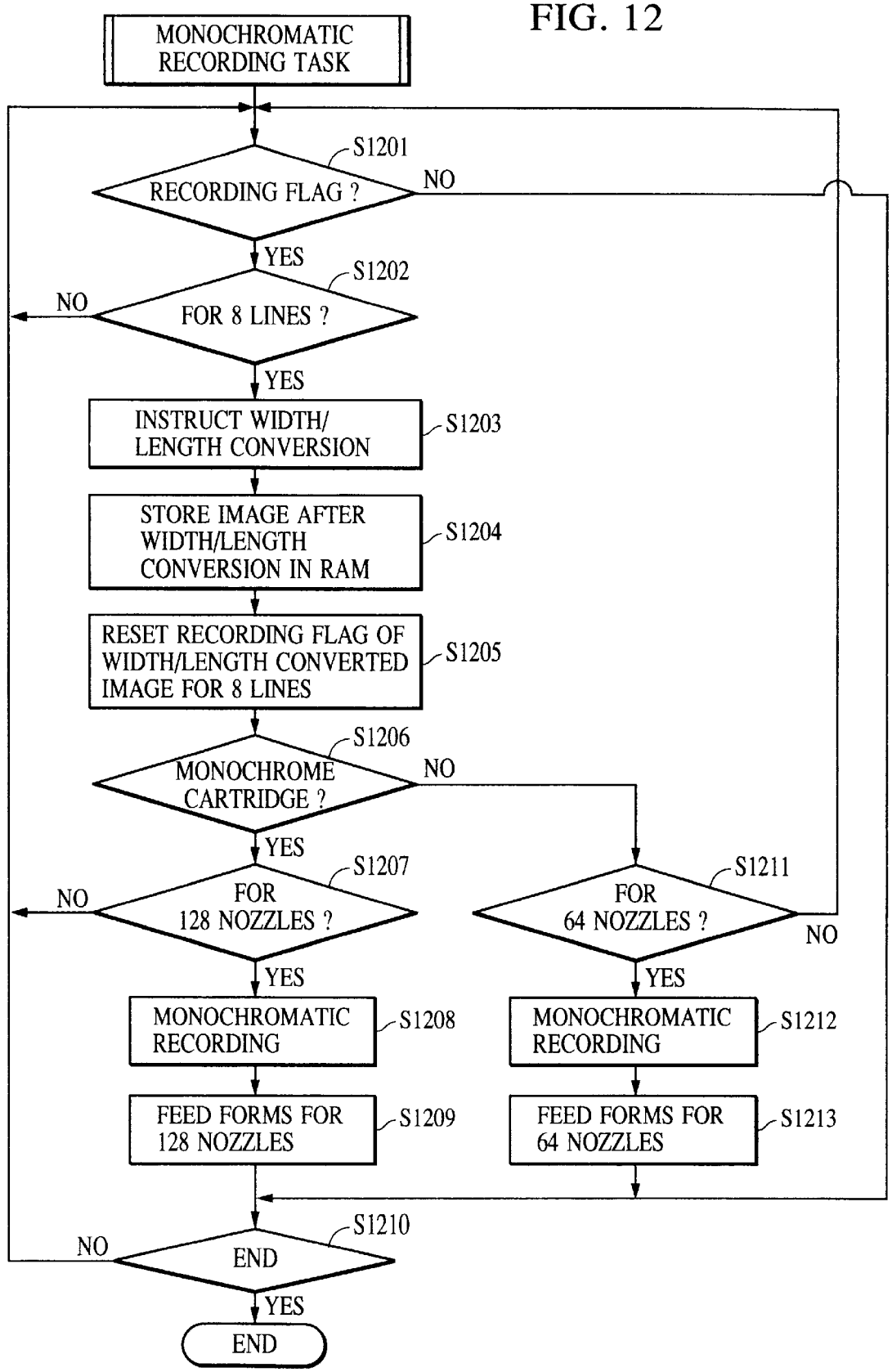
FIG. 12 is a flowchart illustrating monochromatic recording operations in an embodiment of the invention.

Now, the monochrome recording task is described below with reference to FIG. 12. This monochrome recording task is started by step S625 in the flowchart shown in FIG. 6.

The CPU 1 performs the following operations in accordance with the program in the ROM. First in step S1201, it is determined, from the presence or absence of a recording flag, whether or not there is an image to be recorded in the DRAM 18. If it is determined that there is no image to be recorded, processing comes to an end. If it is determined in step S1201 that there is an image to be recorded, it is determined in step S1202 whether or not an image for eight lines to be recorded in step S1202 is accumulated. If it is determined in step S1202 that no image for eight lines to be recorded is present, accumulation is waited for. If accumulated, processing is transferred to step S1203 to instruct the multi-functional gate array 26 to perform a width/length conversion processing of rearranging the image data for eight lines in the main scanning direction in the DRAM 18 into an arrangement in the sub-scanning direction to supply the data to the printer heads. Upon receipt of the instruction of the width/length conversion processing, the multi-functional gate array 26 executes the width/length conversion, and in the following step S1204, the image data are stored in the DRAM 18. In the following step S1205, a recording flag for the eight lines is reset. In the image forming apparatus of the present embodiment, a monochrome image may be recorded with color print heads or monochrome print heads. The color print heads are each arranged with 24 nozzles in the sub-scanning direction and in the order of Y, M, and C in parallel with the main scanning direction. Further, 64 nozzles for recording black are arranged in parallel with the Y, M and C nozzles. A monochrome image can be recorded when K image data for 64 nozzles have been accumulated. On the other hand, monochrome print heads for 128 nozzles are arranged in the sub-scanning direction, and a monochrome image can be recorded when K image data for 128 nozzles have been accumulated. The amount of data recordable at a time differs between the monochrome print head and the color print head. There is therefore a difference in recordable timing caused by a difference in the period of time required for accumulation of recording data. The CPU 1 therefore determines which of the monochrome print heads or color heads are attached in step S1206.

When it is determined in step S1206 that the print heads are monochrome, processing is transferred to step S1207, and it is determined whether or not the image data for 128 nozzles have been accumulated. When data for 128 nozzles are not accumulated, processing is returned to step S1201 to wait for accumulation. When there is accumulation of 128 nozzles, processing is transferred to step S1208 to drive the CR motor 29 by the CPU 1 to record the monochrome image for 128 nozzles on the basis of the accumulated data. When the monochrome image for 128 nozzles has been recorded, the LF motor 27 is driven in step S1209 to feed forms for 128 nozzles.

When it is determined in step S1206 that color print heads are attached, it is determined in step S1211 whether or not data for 64 nozzles have been accumulated. When data for 64 nozzles have not as yet been accumulated, processing is returned to step S1201 to wait for accumulation. When data for 64 nozzles have been accumulated, processing is transferred to step S1212, and the CPU 1 drives the CR motor 29 to record the monochrome image for 64 nozzles in accordance with the accumulated data. When the monochrome image for 64 nozzles has been recorded, the LF motor 27 is driven in the following step S1213 to feed forms for 64 nozzles.

After feeding forms in an amount corresponding to the recording width of the print heads in steps S1209 and S1213, it is determined in the following step S1210 whether or not all the data have been recorded. If not completed, processing is returned to step S1201. If all the data have been recorded, the monochrome recording task is completed.

According to the first embodiment of the invention as described above, it is possible to provide a compact and low-cost image forming apparatus permitting a color copy/monochrome copy without increasing the ink capacity in the ink cartridge for recording a color image.

When the monochrome cartridge is erroneously attached, no color operation is performed. It is therefore possible to provide an easy-to-use image forming apparatus free from unnecessary malfunction. Since determination of the kind of color cartridge and color reading operation are automatically linked together, there is available an easy-to-use image forming apparatus in which it is not necessary for a user to consider the relationship between the kind of cartridge and the copy. When a monochrome cartridge for monochromatic recording is erroneously attached upon color copying, a message prompting replacement of the cartridge is displayed. There is therefore provided an easy-to-use apparatus for the user. Further, even when a color copy cannot be made because of the absence of a cartridge, a message prompting attachment of the cartridge is displayed. It is therefore possible to provide an easy-to-use image forming apparatus for the user. Because determination of the kind of monochrome cartridge and recording operation are automatically linked together, there is available an easy-to-use image forming apparatus in which it is not necessary for a user to consider the relationship between the kind of cartridge and the copy. Even when no monochrome cartridge is available, an appropriate monochrome copy can be obtained. Further, even when a monochrome copy cannot be carried out because of the absence of a cartridge, a message prompting attachment of the cartridge is displayed. It is therefore possible to provide an easy-to-use image forming apparatus for the user.

Even when the form size is different from the original size, the reading operation of the image is not discontinued. It is therefore possible to provide an image forming apparatus with which the user is not required to procure papers of an appropriate size for obtaining a copy in an environment in which paper of various sizes are not always kept in stock such as at home.

Furthermore, even when the paper size is different from the original size, the ink is never ejected onto areas in the absence of a paper, and it is possible to avoid staining of the interior of the apparatus and adherence of ink to the next page of paper.

In the invention, an easy-to-use apparatus is available in which determination of the kind of cartridge, detection of the original size and the paper size, and color reading operation are linked together, and it is not necessary to query the user.

Particularly for a color copy, even when the paper size is different from the original size, a high-image-quality and low-cost image forming apparatus is available without causing a serious deterioration of image quality.

(Second embodiment)

Now, a second embodiment of the invention is described below.

Figure 17:
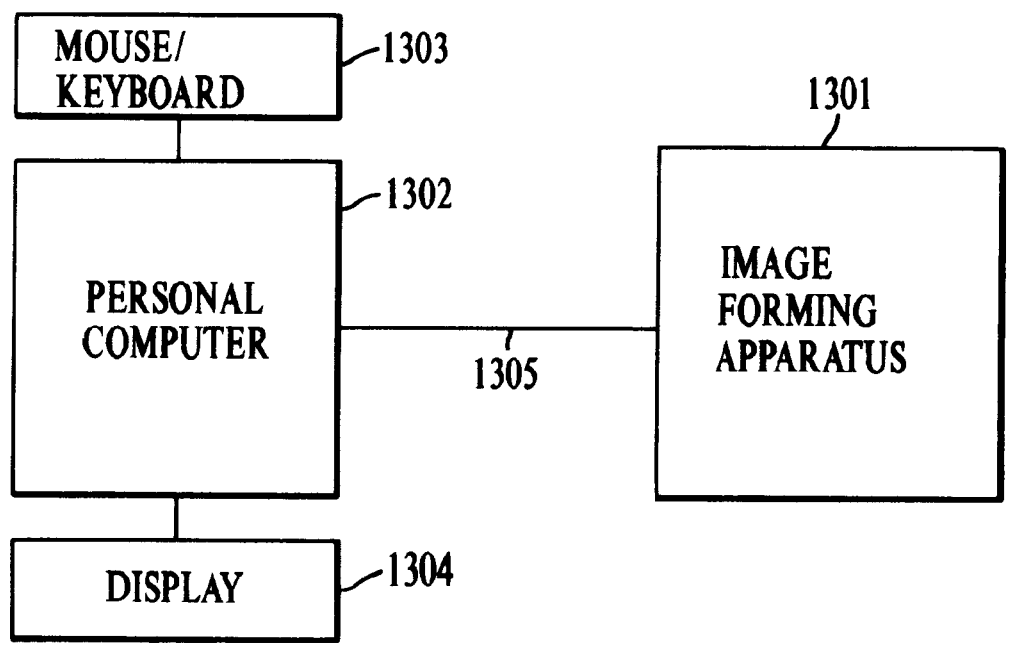
FIG. 17 illustrates a systematized configuration of the image forming apparatus connected to a personal computer of the invention.

FIG. 17 illustrates the second embodiment of the invention, having a configuration in which the image forming apparatus of the invention is connected to a personal computer to form a system. In FIG. 17, 1301 is an image forming apparatus of the invention which has already been described above; 1302 is a personal computer; 1304 is a display which displays operations on the personal computer 1302; 1303 is a mouse/keyboard for entering a command and the like into the personal computer; and 1305 is an interface which performs exchange of data, commands and status information of the image forming apparatus between the personal computer and the image forming apparatus. The personal computer 1302 permits input of instructions of color copy/monochrome copy from the mouse/keyboard 1303 to the image forming apparatus. When an instruction of color-copy/monochrome copy is entered, a color copy/monochrome copy command is entered via the interface 1305 to the image forming apparatus. The CPU 1 in the image forming apparatus 1302 can perform the same operations as pressing of the color copy key (step S602) and pressing of the monochrome copy key (step S601) as shown in FIG. 6 in response to any of the color copy instruction and the monochrome copy instruction from the personal computer. The status information detected in steps S603, S604, S605, S606, S617, S618 and S619 is transferred via the interface 1305 to the personal computer 1302. The personal computer 1302 may display information similar to those of the steps S613, S614, S615, S616, S626, S627 and S628 shown in FIG. 6 on the display 1304 in accordance with information of a program stored in the personal computer in response to the foregoing status information. As a result, the user can immediately find the cause of non-execution of a copy instructed by the operator of the personal computer without being near the image forming apparatus of the invention. While the read section and the record section are integral in this embodiment, these sections may be separate units.

As described above, the present invention is even effectively applicable to a configuration in which the image forming apparatus described under the heading of the first embodiment is connected to a personal computer into a system.

(Third embodiment)

Now, a third embodiment of the invention is described below.

Figure 18:
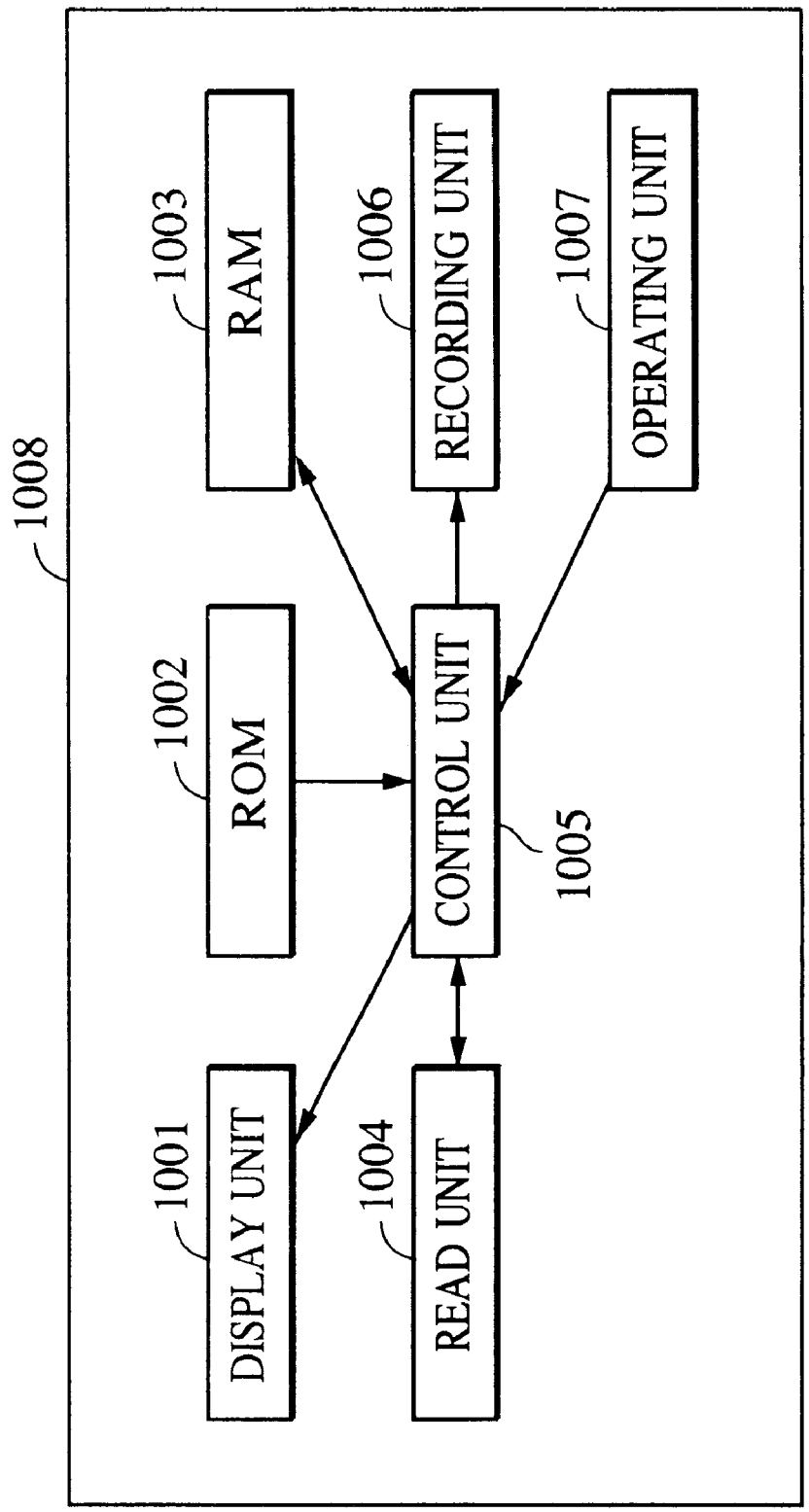
FIG. 18 is a block diagram illustrating a schematic configuration of the image apparatus of the invention.

FIG. 18 is a block diagram illustrating a schematic configuration of the image forming apparatus of this embodiment. In FIG. 18, 1001 is a display section displaying the status of the apparatus and information about the time of day and recording; 1002 is a ROM (read only memory) storing the program executed by a control section 1005 and initial data; 1003 is a RAM (random access memory) storing data capable of being set by the operator; 1004 is a read section which reads out the original, and provided with the both functions of reading a monochrome image and reading of an image comprising a plurality of colors; 1005 is a control section which controls the entire apparatus and executes control operations in compliance with the program stored in the DRAM 2; 1006 is a record section forming an image on a recording medium on the basis of an image signal, having a configuration permitting selective loading of any one of a cartridge for monochrome recording and a cartridge for color image recording through replacement; 1007 is an operating section operating the apparatus and obtaining various pieces of information, composed of a plurality of key-in switches and operating circuits for key-in switches; 1008 represents a complete view of the image forming apparatus.

FIG. 19 is a flowchart illustrating operations in this embodiment. The operations in this embodiment are described below with reference to the flowchart.

Upon execution of the copy operation, it is determined in step S101 whether the execution covers a monochrome copy or a color copy. When the monochrome copy is executed, the attached cartridge for recording is identified in step S102. Attachment of the cartridge for monochrome image poses no problem: processing is transferred to step S109, the original is read out as a monochrome image, and a recording operation of the monochrome image is executed in the following step S110 to complete this processing operation.

When it is determined in step S102 that the cartridge for color image recording is attached upon monochrome copy operation, processing is transferred to step S103, and a warning is displayed on the display section 1001 to the user to notify that the kind of cartridge does not match the image to be copied. Other examples of this notification include one showing that a wrong kind of cartridge is attached and a message prompting replacement of the cartridge. In the following step S104, it is determined whether or not the user has replaced the cartridge in compliance with the notification. When the cartridge has been replaced, processing is transferred to step S109 to read out the original as a monochrome image, and in the following step S110, the monochrome image is recorded to complete the copy operation. When it is determined in step S104 that the cartridge has not as yet been replaced, processing is transferred to step S105 to confirm the set information. The term set information means setting of processing when the cartridge for color recording is attached upon monochrome copy operation. Choices in this case include recording the monochrome image by the use of the cartridge for color recording, and discontinuing the processing without executing copy operation. Selection from among these choices can be made by the user taking account of the user's convenience. Any of these choices are previously selected upon shipping from the factory by default. In step S105, when recording of the monochrome image by the use of the cartridge for color recording is selected, processing is transferred to step S107 to read out the original as a monochrome image. In the following step S108, a monochrome image is formed by the use of the cartridge for color recording to complete the copy operation. If the cartridge for color recording can record a black image, a monochrome image may be formed by the utilization of this function, or a monochrome image may be formed by expressing black with a mixture of other colors of ink (black expressed by this technique is referred to as the process black or composite black). For the purpose of increasing the recording rate of a monochrome image, dots based on the black recording material and dots based on the process black may be mixed. The case where the setting prescribes discontinuance of processing, without executing copy operation is next described. When the cartridge for color recording is attached upon monochrome copy operation in step S105, processing is transferred to step S106, and after displaying an error message, the processing comes to an end without executing the copy operation.

When it is determined in step S101 that the requested operation is not the monochrome copy operation, it is further determined in step S111 that the operation to be conducted is the color copy operation, and in the following step S112, whether or not the cartridge currently attached is the cartridge for color recording. When the cartridge for color recording is attached, processing is transferred to step S118 to read out the original as a color image, and in the following step S119, the color image read out onto the recording medium is recorded to complete the copy operation. When it is determined in step S112 that the cartridge for monochrome recording is currently attached, processing is transferred to step S113, and a warning is displayed on the display section 1001 to the user for notifying that the attached cartridge is not in agreement with the image to be copied. Other examples of this notification include one showing that a wrong kind of cartridge is attached and a message prompting replacement of the cartridge. In the following step S114, it is determined whether or not the user has appropriately replaced the cartridge in compliance with the notification. When it is determined in this step S114 that the cartridge has been replaced by the one for color recording, processing is transferred to step S118 to read out the original as a color image, and in step S119, the color image is recorded to complete the copy operation. When it is determined in step S114 that the cartridge has not as yet been replaced, processing is transferred to step S115 to confirm the set information. The term set information means setting of processing when the cartridge for monochrome recording is attached upon color copy operation. Choices in this case include performing a monochrome copy operation and discontinuing processing without executing the copy operation. Selection from among these choices can be made by the user taking account of user's convenience. Any of these choices are previously selected upon shipping from the factory by default. When it is determined in step S115 that execution of the monochrome copy operation is set, processing is transferred to step S109 to read out the original as a monochrome image, and in the following step S110, the monochrome image is recorded to complete the copy operation. When discontinuance of processing without performing a copy operation is set in step S115, processing is transferred to step S116, and an error message is displayed, and processing comes to an end.

In the present embodiment, the display section 1001 shown in FIG. 18 has been described as means to make a notification to the user. The invention is not however limited to this, and voice notification may be made by providing a buzzer or a speaker, and the user can be appropriately notified by combining display and voice notification.

As has been described in the embodiment shown above, when the type of cartridge currently attached to the apparatus does not match reading and recording of the original as a monochrome image or reading and recording of the original as a color image, it is possible to prompt the user to replace the cartridge, and when the cartridge is not replaced, to change the copy mode in compliance with the setting, or execute the copy operation by the use of the cartridge currently attached. It is thus possible to execute processing without complicating the user's operation. With reference to this embodiment, it is possible to provide an easy-to-use image forming apparatus which does not cause a malfunction in color copy operation or in monochrome copy operation, without increasing the running cost.

(Other embodiments)

In the embodiments described above, the ink jet recording technique has been used as an example, which comprises conducting recording by ejecting ink. The invention is not however limited to this, and any other appropriate recording technique may be adopted.

The present invention brings about particularly remarkable effects in a recording apparatus using a recording head based on the ink jet technique which comprises forming a solution by the use of thermal energy for recording, from among various methods of the ink jet recording technique.

As to the typical configuration and principle, it is desirable to utilize the basic principle as disclosed in the U.S. Pat. Nos. 4,723,129 and 4,740,796. This technique is applicable to both the on-demand type and the continuous type ink jet printer. Particularly in the case of the on-demand type, which comprises the steps of generating thermal energy in an electro-thermal converter by applying at least one driving signal which can cause a sharp temperature increase over nuclear boiling corresponding recorded information to the electro-thermal converter arranged in correspondence to a sheet or a channel holding a liquid (ink), thereby causing membrane boiling on the heat affected surface of the recording head, it is possible to form bubbles in the liquid (ink) one-by-one corresponding to the driving signal, thus providing remarkable advantages. At least one drop is formed by pouring the liquid (ink), through a pouring opening, by the growth and shrinkage of bubbles. By using a pulse-shaped driving signal, growth and shrinkage of a bubble can be caused immediately and appropriately, thus permitting achievement of ejection of a liquid (ink) particularly excellent in response. The pulse-shaped driving signals as disclosed in the U.S. Pat. No. 4,463,359, and U.S. Pat. No. 4,3452,262 are especially suitable. Further excellent recording can be achieved by adopting the conditions disclosed in the U.S. Pat. No. 4,323,124 regarding the temperature increase rate of the foregoing heat affected surface.

Applicable configurations of the recording head include, in addition to the combinations of an ejecting port, a channel and an electro-thermal converter as disclosed in the aforesaid U.S. Patents (with a linear liquid channel or an orthogonal liquid channel), a configuration having a heat affected region arranged at a curved portion, as disclosed in the U.S. Pat. No. 4,558,333 and U.S. Pat. No. 4,459,600. In addition, a configuration having a slit common to a plurality of electro-thermal converters as a ejecting section of the electro-thermal converter, as disclosed in Japanese Unexamined Patent Publication No. S59-123,670, and a configuration having an opening absorbing pressure wave of thermal energy corresponding to the pouring section, as disclosed in Japanese Unexamined Patent Publication No. S59-138,461 are also useful for utilizing the effects of the present invention. That is, a recording head of any shape can be operated at a higher efficiency for recording according to the present invention.

As components of the recording apparatus of the present invention, addition of ejecting restoring mens of the recording head and preliminary auxiliary means is useful for further stabilizing the effects of the invention. More specifically, useful means as components include capping means for the recording head, cleaning means, pressing or attracting means, preheating means based on an electro-thermal converter or a separate heating element or a combination thereof, and preliminary ejecting means conducting pouring separately from recording.

While the ink has been described as a liquid in the foregoing embodiment of the invention shown above, an ink which solidifies at room temperature or below, and softens or liquefies at room temperature may be used. It is at present a common practice, in the ink jet technique, to control temperature so as to maintain ink viscosity within a stable ejecting range by adjusting temperature of the ink within a range of from 30° C. to 70° C. An ink exhibiting a liquidus phase upon applying a recording signal may therefore be employed. In addition, in order to positively prevent temperature increase caused by thermal energy by utilizing it as an energy of change in phase from solid to liquid of the ink, and to prevent evaporation of the ink, an ink which solidifies by holding and is liquefied by heating may be utilized. In any events, applicable inks include one which is in a liquid state by imparting thermal energy in sync with the recording signal and a liquid ink is ejected, and one which is liquefied only upon imparting a thermal energy. Such types of ink are disclosed, for example in Japanese Unexamined Patent Publication No. S54-56847 and No. S60-71,260 which are arranged opposite to the electro-thermal converter in a state held as a liquid or a solid by recesses on a porous sheet of throughholes. In the present invention, application of the membrane boiling technique mentioned above is the most effective for any of these types of ink.

According to the present invention, as described above, it is possible to provide a compact, low-cost and easy-to-use image forming apparatus which can be used both for a color copy and a monochrome copy without increasing the ink capacity of the ink cartridge for color image recording.

What is claimed is:

1. An image forming apparatus which selectively and exchangeably mounts one of a first recording means for recording in a plurality of colors and a second recording means for recording in monochrome, and for forming an image on a recording medium, comprising:

reading means for reading an image on an original in a plurality of colors or in monochrome;

mounting means for exchangeably mounting said first recording means and said second recording means;

determining means for determining a kind of recording means mounted in said mounting means;

instructing means which instructs either a color copy operation of reading the image on the original in a plurality of colors by said reading means and recording same, or a copy operation of reading the image on the original in monochrome and recording same;

control means for causing, when said instructing means instructs a color copy operation, said determining means to determine whether or not the first recording means is mounted by said mounting means, and when it is determined that the first recording means is mounted, for conducting control so as to execute the color copy operation; and notifying means for giving a notification to a user, wherein said control means sends a message promoting mounting of said first recording means by said notifying means when it is determined that said first recording means is not mounted.

2. The image forming apparatus according to claim 1, wherein, when said instructing means instructs a color copy operation, and the second recording means is mounted by said mounting means, a message prompting change of the kind of recording means is notified by said notifying means.

3. The image forming apparatus according to claim 1, further comprising:

a display unit for displaying information about the apparatus, wherein, said notifying means notifies said display unit to display such information.

4. The image forming apparatus according to claim 1, wherein said notifying means performs a voice notification.

5. The image forming apparatus according to claim 1, wherein said determining means has a configuration for determining whether or not a recording means is attached to said image forming apparatus; and when said instructing means instructs a color copy operation, and said determining means determines that the recording means is not mounted by said mounting means, said notifying means sends a message prompting mounting of said first recording means.

6. The image forming apparatus according to claim 1, wherein said first recording means and said second recording means have ejecting means for ejecting an ink onto the recording medium to form an image.

7. The image forming apparatus according to claim 6, wherein said ejecting means serves as an electrothermal energy converter which imparts thermal energy to the ink.

8. An image forming apparatus which selectively and exchangeably mounts one of a first recording means for recording in a plurality of colors and second recording means for recording in monochrome, and for forming an image on a recording medium, comprising:

reading means for reading an image on an original in a plurality of colors or in monochrome;

mounting means for exchangeably mounting said first recording means and said second recording means;

determining means for determining a kind of recording means mounted in said mounting means;

instructing means for instructing either a color copy operation of reading the image on the original in a plurality of colors by said reading means and recording same, or a copy operation of reading the image on the original in monochrome and recording same; and control means for forming, when said instructing means instructs a monochromatic copy operation, and said detecting means determines whether or not the second recording means is mounted by said mounting means, the read monochromatic image by said second recording means, wherein, when said instructing means instructs a monochromatic copy operation, and said first recording means is mounted by said mounting means, said control means forms a readout monochromatic image with the use of said first recording means.

9. The image forming apparatus according to claim 8, further comprising:

notifying means for giving a notification to a user;

wherein said determining means has a configuration for permitting determination of whether or not a recording means is attached; and when said instructing means instructs a monochromatic copy operation, and it is determined by said determining means that a recording means is not mounted by said mounting means, said notifying means sends a message prompting attachment of said second recording means.

10. The image forming apparatus according to claim 8, wherein said first recording means and said second recording means each include ejecting means for ejecting an ink onto the recording medium for forming an image thereon.

11. The image forming apparatus according to claim 10, wherein said ejecting means serves as an electro-thermal energy converter which applies thermal energy to the ink.

12. An image forming apparatus which selectively and exchangeably mounts first recording means for recording in a plurality of colors and second recording means for recording in monochrome, and for forming an image on a recording medium, comprising:

reading means for reading an image on an original in a plurality of colors or in monochrome;

mounting means for exchangeably mounting said first recording means and said second recording means;

determining means for determining a kind of recording means mounted in said mounting means;

instructing means which instructs either a color copy operation of reading the image on the original in a plurality of colors by said reading means and recording same, or a copy operation of reading the image on the original in monochrome and recording same;

a control means for controlling the copy operation in response to an instruction by said instructing means and a result of determination by said determining means; and setting means for making a setting to the effect that said first recording means is caused to perform a monochromatic copy operation, wherein, when said instructing means instructs a monochromatic copy operation, and said determining means determines that said first recording means is mounted, said control means makes a decision as to whether or not the monochromatic copy operation is to be executed by said first recording means in response to the setting made by said setting means.

13. The image forming apparatus according to claim 12, further comprising:

notifying means for giving a notification to a user;

wherein, when said instructing means instructs a monochromatic copy operation, and said determining means determines that the first recording means is mounted, said control means controls said notifying means to perform a notification.

14. The image forming apparatus according to claim 12, further comprising:

notifying means for giving a notification to a user;

wherein, when said instructing means instructs a color copy operation, and said determining means determines that the second recording means is mounted, said control means causes said notifying means to perform a notification.

15. The image forming apparatus according to claim 12, further comprising:

setting means for making a setting to the effect that, when the second recording means is mounted upon a color copy operation, the operation is switched over to a monochromatic copy operation, wherein, when said instructing means instructs a color copy operation, and said determining means determines that the second recording means is mounted, said control means causes said second recording means to execute a monochromatic copy operation in response to a setting by said setting means.

16. The image forming apparatus according to claim 12, wherein:

said first recording means and said second recording means have ejecting means which eject an ink onto a recording medium to form an image thereon.

17. The image forming apparatus according to claim 16, wherein:

said ejecting means serves as an electro-thermal energy converter which applies a thermal energy to the ink.

18. An image forming apparatus which selectively and exchangeably mounts first recording means for recording in a plurality of colors and second recording means for recording in monochrome, and for forming an image on a recording medium, comprising:

reading means for reading out an image on an original in a plurality of colors and in monochrome;

mounting means for exchangeably mounting said first recording means and said second recording means;

determining means for determining a kind of recording means mounted in said mounting means;

instructing means for instructing as to whether the image on the original is to be read out in a plurality of colors or in monochrome by said reading means;

original size detecting means for detecting a size of the original from which the image is read out;

paper size detecting means for detecting a size of the recording medium; and selecting means for selecting any one of full-size recording, reduced-size recording and partial recording on the basis of a result of determination by said determining means, an instruction by said instructing means, a size of the original and a size of paper to be recorded on.

19. The image forming apparatus according to claim 18, wherein:

when a result of determination of said determining means is said first recording means and said instructing means instructs reading in color, said selecting means does not select reduced-size recording.

20. The image forming apparatus according to claim 18, wherein:

when the size of the recording medium is smaller than the size of the original, said selecting means selects partial recording in which only part of the original is recorded, and when the size of the recording medium or the paper is equal to, or larger than the original size, said selecting means selects full-size recording.

21. The image forming apparatus according to claim 18, wherein:

when said instructing means instructs reading in monochrome, and the size of the recording medium is smaller than the original size and is not a postcard size, said selecting means selects reduced-size recording; when said instructing means instructs reading in monochrome and the size of the recording medium is smaller than the original size and is equal to the postcard size, said selecting means selects partial recording in which only part of the original is recorded; and when the size of the recording medium is equal to, or larger than the original size, said selecting means selects full-size recording.

22. The image forming apparatus according to claim 18, wherein:

selection by said selecting means is accomplished without operator intervention.

23. The image forming apparatus according to claim 18, wherein:

said first recording means and said second recording means each have an ejecting means for ejecting an ink onto the recording medium, thereby forming an image.

24. The image forming apparatus according to claim 23, wherein:

said ejecting means serves as an electro-thermal energy converter which applies a thermal energy to an ink.

25. An image forming system which selectively and exchangeably mounts first recording means for recording in a plurality of colors and second recording means for recording in monochrome, and for forming an image on a recording medium, comprising:

an image forming apparatus comprising reading means for reading out an image on an original in a plurality of colors and in a monochrome;

mounting means for exchangeably mounting said first recording means and said second recording means;

determining means for determining a kind of the recording means mounted in said mounting means;

copy operation control means which performs either a copy operation in a color copy mode in which the image on the original is read out in a plurality of colors by the use of said reading means and recording same, or in a monochromatic copy mode in which the image on the original is read out in a monochrome and recording same; and monitoring means for monitoring a result of determination by said determining means and a status of recording;

an external information processing terminal which is connected to said image forming apparatus, having instructing means for instructing a color copy operation and a monochromatic copy operation to said copy operation control means, and for receiving monitoring information from said monitoring means; and control means for controlling a copy operation of said image forming apparatus in accordance with an instruction from said instructing means, wherein said external information processing terminal receives information indicative of a copy operation by said control means.

26. The image forming system according to claim 25, wherein said image forming apparatus includes:

a display unit for displaying information indicative of control by said control means, and wherein said control means monitors information from said monitoring means.

27. The image forming system according to claim 25, wherein:

said first recording means and said second recording means have ejecting means for ejecting an ink onto the recording medium, thereby forming an image.

28. The image forming system according to claim 27, wherein:

said ejecting means serves as an electro-thermal energy converter which applies a thermal energy to the ink.

29. A method of forming an image in an apparatus which has reading means for reading out an image on an original in a plurality of colors or in monochrome, and selectively and exchangeably mounts first recording means for recording in a plurality of colors and second recording means for recording in monochrome, and for forming an image on a recording medium, comprising:

an instructing step of instructing whether the process to be executed is a color copy operation for reading out an image on an original in a plurality of colors and recording same, or a monochromatic copy operation for reading out the image on the original in monochrome and recording same;

a determining step of determining a kind of mounted recording means;

a controlling step of controlling as to whether an original is to be read out in a plurality of colors or in monochrome by said reading means in response to an instruction given in said instructing step and a result of determination in said determining step; and a notifying step of giving a notification to a user, wherein said controlling step sends a message promoting mounting of said first recording means by said notifying step when it is determined that said first recording means is not mounted.

30. The method of forming an image according to claim 29, wherein, when a color copy operation is instructed in said instructing step, and said second recording means is determined to be mounted, said controlling step conducts a notification of prompting replacement of the second recording means.

31. The method of forming an image according to claim 29, further comprising the step of:

determining whether or not said recording means is mounted;

wherein, when a color copy operation is instructed in said instructing step, and a recording means is not mounted, a notification prompting mounting of a recording means is performed in said controlling step.

32. The method of forming an image according to claim 29, wherein:

a monochromatic image is formed by said second recording means during said monochromatic copy operation.

33. The method of forming an image according to claim 29, wherein:

said first recording means and said second recording means have ejecting means for ejecting an ink onto the recording medium, thereby forming an image.

34. The method of forming an image according to claim 33, wherein:

said ejecting means serves as an electro-thermal energy converter which applies a thermal energy to the ink.

35. A method of forming an image in an apparatus which has reading means for reading out an image on an original in a plurality of colors or in monochrome, selectively and changeably mounts first recording means for recording in a plurality of colors and second recording means for recording in monochrome, and for forming an image on a recording medium, comprising the steps of:

an instructing step of instructing as to whether the image on the original is to be read out in a plurality of colors or in monochrome;

an original size detecting step of detecting an original size;

a reading step of reading out the original in a plurality of colors or in monochrome in compliance with said instructing step by the use of said reading means;

a determining step of determining a kind of recording means to be mounted on said apparatus;

a form size detecting step of detecting a size of the recording medium;

a selecting step of selecting any one of full-size recording, reduced-size recording and partial recording on the basis of a result of determination by said determining step, an instruction by said instructing step, a size of said original and a size of paper to be recorded on; and a recording step of forming an image on a form by one of said first recording means when reading out the image on the original in a plurality of colors, and by said second recording means when reading out in monochrome.

36. The method of forming an image according to claim 35, wherein:

when the result of determination by said determining step is said first recording means and said instructing step instructs reading of the original in a plurality of colors, said selecting step does not select reduced-size recording.

37. The method of forming an image according to claim 35, wherein:

said selecting step selects partial recording of recording only part of the original when the recording medium size is smaller than the original size, and selects full-size recording when the recording medium size is equal to, or larger than, the original size.

38. The method for forming an image according to claim 35, wherein:

said selecting step selects reduced-size recording when said instructing step instructs reading in monochrome and the recording medium size is smaller than the original size and is not a postcard size; selects partial recording of recording only part of the original when said instructing step instructs reading in monochrome and the recording medium size is smaller than the original size and equal to the postcard size; and selects full-size recording when the recording medium size is equal to, or larger than, the original size.

39. The method of forming an image according to claim 35, wherein:

selection in said selecting step is accomplished without operator intervention.

40. The method of forming an image according to claim 35, wherein:

said first recording means and said second recording means have ejecting means for ejecting an ink onto the recording medium, thereby forming an image.

41. The method of forming an image according to claim 40, wherein:

said ejecting means serves as an electro-thermal energy converter which applies a thermal energy to the ink.

* * * * *

UNITED STATES PATENT AND TRADEMARK OFFICE
CERTIFICATE OF CORRECTION

PATENT NO. : 6,164,740
DATED : December 26, 2000
INVENTOR(S) : Nobuyuki Hirai et al.

It is certified that error appears in the above-identified patent and that said Letters Patent is hereby corrected as shown below:

Title page,
Item [56] References Cited, under FOREIGN PATENT DOCUMENTS;
"79-056847" should read -- 54-056847 --;
"84-123670" should read -- 59-123670 --;
"84-138461" should read -- 59-138461 --; and
"85-071269" should read -- 60-071269 --.

Column 1,
Line 21, "has" should be deleted.

Column 2,
Line 32, "or use" should read -- use or --.

Column 4,
Line 36, "cartridge" should read -- cartridge, --; and
Line 46, "and" should be deleted.

Column 6,
Line 36, "an" should read -- a --.

Column 7,
Line 7, "head" should read -- head is --; and
Line 8, "head" should -- head is --.

Column 9,
Line 33, "has" should be deleted.

Column 15,
Line 12, "correction;" should read -- correction, --.

Column 16,
Line 6, "not shown." should read -- (not shown). --.

Column 18,
Line 31, "matching" should read -- to match --;
Line 33, "matching" should read -- in synchronization with --;
Line 53, "pel" should read -- pels --; and
Line 62, "B4-size" should read -- B4 size --.

UNITED STATES PATENT AND TRADEMARK OFFICE
CERTIFICATE OF CORRECTION

PATENT NO. : 6,164,740
DATED : December 26, 2000
INVENTOR(S) : Nobuyuki Hirai et al.

It is certified that error appears in the above-identified patent and that said Letters Patent is hereby corrected as shown below:

Column 22,
Line 38, "information. The" should read -- information. ¶The --.

Column 24,
Line 31, "4,3452,262" should read -- 4,345,262 --.

Column 25,
Line 9, "events," should read -- event, --.

Signed and Sealed this

Twenty-fifth Day of December, 2001

Attest:

Attesting Officer

JAMES E. ROGAN
Director of the United States Patent and Trademark Office